United States Patent
Beall et al.

(10) Patent No.: US 11,554,339 B2
(45) Date of Patent: Jan. 17, 2023

(54) PLUGGED HONEYCOMB BODIES, EXTRUSION DIES AND METHODS OF MANUFACTURING THEREOF

(71) Applicant: CORNING INCORPORATED, Corning, NY (US)

(72) Inventors: Douglas Munroe Beall, Painted Post, NY (US); Dana Craig Bookbinder, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/294,084

(22) PCT Filed: Nov. 1, 2019

(86) PCT No.: PCT/US2019/059359
§ 371 (c)(1),
(2) Date: May 14, 2021

(87) PCT Pub. No.: WO2020/101913
PCT Pub. Date: May 22, 2020

(65) Prior Publication Data
US 2022/0126230 A1     Apr. 28, 2022

Related U.S. Application Data

(60) Provisional application No. 62/768,688, filed on Nov. 16, 2018.

(51) Int. Cl.
*B01D 46/24*    (2006.01)
*B28B 3/26*     (2006.01)
*F01N 3/022*    (2006.01)

(52) U.S. Cl.
CPC ......... *B01D 46/249* (2021.08); *B01D 46/247* (2013.01); *B01D 46/2482* (2021.08);
(Continued)

(58) Field of Classification Search
CPC ............... B01D 46/247; B01D 46/249; B01D 46/2482; B28B 3/269; F01N 3/0222; F01N 2330/34; F01N 2330/06; F01N 3/2828
(Continued)

(56) References Cited

U.S. PATENT DOCUMENTS 3,885,977 A    5/1975  Lachman et al.
4,276,071 A *  6/1981  Outland ................ F01N 3/0222
                                                  428/116
(Continued)

FOREIGN PATENT DOCUMENTS

CN    107921350 A    4/2018
EP     0089751 A1    9/1983
(Continued)

OTHER PUBLICATIONS

Chinese Patent Application No. 201980089253.1, Office Action, dated Apr. 13, 2022, 21 pages (9 pages of English Translation and 12 pages of Original Document), Chinese Patent Office.
(Continued)

*Primary Examiner* — Tom P Duong
(74) *Attorney, Agent, or Firm* — Joseph M. Homa

(57) ABSTRACT

A plugged honeycomb structure includes intersecting porous walls extending in an axial direction between an inlet end and an outlet end of the honeycomb structure, the intersecting porous walls forming a matrix of repeating unit cells arranged in a repeating pattern. The repeating unit cells comprise: three or four channels, each channel formed by four walls, wherein the three or four channels comprise more inlet channels than outlet channels, at least one wall of an
(Continued)

inlet channel or an outlet channel is intersected midwall by a wall, an area of an outlet channel is equal to or less than an area of any of the inlet channels, and continuous line segments extending along walls of at least three repeating unit cells. Other plugged honeycomb structures, plugged honeycomb bodies, honeycomb extrusion dies, and methods are disclosed.

15 Claims, 11 Drawing Sheets

(52) U.S. Cl.
CPC .......... *B01D 46/2484* (2021.08); *B28B 3/269* (2013.01); *F01N 3/0222* (2013.01); *B01D 2279/30* (2013.01); *F01N 2330/34* (2013.01)

(58) Field of Classification Search
USPC .............................................. 55/523; 428/116
See application file for complete search history.

(56) References Cited

U.S. PATENT DOCUMENTS

| | | | |
|---|---|---|---|
| 5,332,703 | A | 7/1994 | Hickman |
| 6,221,308 | B1 | 4/2001 | Peng |
| 6,259,078 | B1 | 7/2001 | Araya |
| 6,391,813 | B1 | 5/2002 | Merkel |
| 6,508,852 | B1 | 1/2003 | Hickman et al. |
| 6,541,407 | B2 | 4/2003 | Beall et al. |
| 7,017,278 | B2 | 3/2006 | Kato |
| 7,326,270 | B2 | 2/2008 | Hong et al. |
| 7,596,885 | B2 | 10/2009 | Adrian et al. |
| 8,974,724 | B2 | 3/2015 | Day et al. |
| 9,005,517 | B2 | 4/2015 | Bronfenbrenner et al. |
| 9,038,284 | B2 | 5/2015 | Feldman et al. |
| 9,335,093 | B2 | 5/2016 | Feldman et al. |
| 9,446,560 | B2 | 9/2016 | Bronfenbrenner et al. |
| 9,452,578 | B2 | 9/2016 | Bronfenbrenner et al. |
| 2003/0041730 | A1 | 3/2003 | Beall et al. |
| 2005/0016141 | A1 | 1/2005 | Hong et al. |
| 2008/0124517 | A1 | 5/2008 | Beall et al. |
| 2009/0101016 | A1 | 4/2009 | Fleck |
| 2018/0326343 | A1 | 11/2018 | Beall et al. |
| 2019/0374896 | A1 | 12/2019 | Beall et al. |

FOREIGN PATENT DOCUMENTS

| | | |
|---|---|---|
| EP | 1928577 A1 | 6/2008 |
| EP | 2221099 A1 | 8/2010 |
| JP | 49-115110 A | 11/1974 |
| JP | 58-196820 A | 11/1983 |
| JP | 2004-511335 A | 4/2004 |
| WO | 2008/066765 A1 | 6/2008 |
| WO | 2014/046912 A1 | 3/2014 |
| WO | 2016/158420 A1 | 10/2016 |
| WO | 2017/185091 A2 | 10/2017 |
| WO | 2018/144532 A1 | 8/2018 |
| WO | 2019/213563 A2 | 11/2019 |

OTHER PUBLICATIONS

International Search Report and Written Opinion of the International Searching Authority; PCT/US19/59359; dated Feb. 20, 2020; 12 pages; European Patent Office.

Japanese Patent Application No. 2021-526592, Office Action dated Jun. 30, 2022, 6 pages (3 pages of English Translation and 3 pages of Original document), Japanese Patent Office.

\* cited by examiner

PLUGGED HONEYCOMB BODIES, EXTRUSION DIES AND METHODS OF MANUFACTURING THEREOF

This is a national stage application under 35 U.S.C. § 371 of International Application No. PCT/US2019/059359, filed on Nov. 1, 2019, which claims the benefit of priority under 35 U.S.C. § 119 of U.S. Provisional Application No. 62/768,688 filed on Nov. 16, 2018, the content of which is incorporated herein by reference in its entirety.

FIELD

Embodiments of the disclosure relate to honeycomb structures and bodies, and more particularly to plugged honeycomb bodies, extrusion dies, and methods of manufacturing thereof.

BACKGROUND

Ceramic honeycomb structures with a matrix of formed from interconnected porous walls can be utilized in exhaust after-treatment systems.

SUMMARY

Embodiments of the present disclosure provide honeycomb structures and bodies.

Other embodiments of the present disclosure also provide honeycomb extrusion dies configured to extrude honeycomb structures and bodies.

Other embodiments of the present disclosure also provide methods of manufacturing honeycomb structures and bodies.

Another embodiment of the disclosure provides a plugged honeycomb structure. The plugged honeycomb structure comprises intersecting porous walls extending in an axial direction between an inlet end and an outlet end of the plugged honeycomb structure, the intersecting porous walls forming a matrix of repeating unit cells arranged in a repeating pattern, wherein the repeating unit cells comprise: three or four channels, each channel formed by four walls, wherein the three or four channels comprise more inlet channels than outlet channels, at least one wall of an inlet channel or an outlet channel is intersected midwall by a wall, an area of an outlet channel is equal to or less than an area of any of the inlet channels, and continuous line segments extending along walls of at least three repeating unit cells.

Another embodiment of the disclosure provides a honeycomb extrusion die. The honeycomb extrusion die comprises an arrangement of pins forming intersecting slots, the pins comprising inlet pins and outlet pins, forming a matrix of repeating units of pins arranged in a repeating pattern, wherein the repeating units comprise: three or four pins, each pin abutted by four slots, wherein the three or four pins comprise more inlet pins than outlet pins, at least one slot abutting an inlet pin or an outlet pin intersected midslot by a slot, an area of an outlet pin equal to or less than an area of any of the inlet pins, and continuous slot segments extending along slots of at least three repeating units.

Another embodiment of the disclosure provides a method of manufacturing a honeycomb structure. The method comprises providing an extrusion die comprising: an inlet face and an exit face; slot inlets; a plurality of pins disposed between the slot inlets and the exit face, the plurality of pins including side surfaces configured to define a matrix of intersecting slots; the plurality of pins comprising inlet pins and outlet pins forming a matrix of repeating units of pins arranged in a repeating pattern, wherein the repeating units comprise: three or four pins, each pin abutted by four slots, wherein the three or four pins comprise more inlet pins than outlet pins, at least one slot abutting an inlet pin or an outlet pin intersected midslot by a slot, an area of an outlet pin equal to or less than an area of any of the inlet pins, and continuous slot segments extending along slots of at least three repeating units; and extruding a batch mixture through the extrusion die.

Additional features of the disclosure will be set forth in the description which follows, and will be apparent from the description, or may be learned by practice of the disclosure. It is to be understood that both the foregoing general description and the following detailed description are provide example embodiments and is intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate example embodiments of the disclosure, and together with the description, serve to explain the principles of the disclosure.

DETAILED DESCRIPTION

Figure 1:
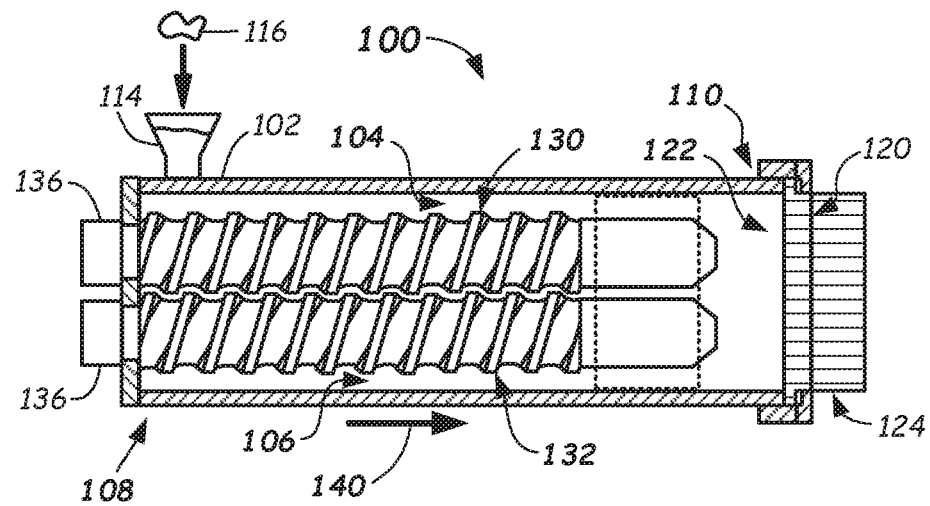
FIG. 1 schematically illustrates a cross-sectioned side view of an extruder apparatus configured to extrude honeycomb bodies comprising repeating unit cells according to embodiments of the disclosure.

Reference will now be made in detail to embodiments of plugged honeycomb bodies and honeycomb structures formed therein. The plugged honeycomb bodies may be used, for example, in porous ceramic honeycomb articles such as porous ceramic wall-flow particulate filters. Example embodiments of the plugged honeycomb bodies are illustrated in the accompanying drawings. Whenever possible, the same or similar reference numerals will be used throughout the drawings to refer to the same or similar parts.

Plugged and/or partially-plugged honeycomb bodies may be used in particulate filters, such as in after-treatment of exhaust from diesel and/or gasoline engines. The plugged honeycomb bodies may comprise honeycomb structures formed from a plurality of intersecting porous walls, such as porous ceramic walls including open interconnected porosity. The porous walls form a plurality of channels extending between an inlet end and an outlet end of the plugged honeycomb body. Some channels (e.g., inlet channels) can be plugged at the outlet end of the honeycomb bodies and at least some of the remaining channels (e.g., outlet channels) may be plugged at the inlet end. Gas entering the inlet channels at the inlet end of the plugged honeycomb body flows through the porous walls constituting the honeycomb structure and into the outlet channels. Particulates (e.g., soot, ash, and other particulates in exhaust gases) in the gas are filtered or trapped in or on the porous walls and may accumulate in the inlet channels and/or in the porous walls thereof. The gas exits the plugged honeycomb body via the outlet channels at the outlet end of the plugged honeycomb body. Particulates continue to accumulate in the porous walls of the inlet channels in use, but can be periodically burned off through a regeneration process to return the plugged honeycomb filter to a low non-soot loaded back-pressure.

In order to increase the time interval between regeneration processes, the storage capacity of the plugged honeycomb bodies may be increased. The ash storage capacity may be defined as the maximum amount of ash, when loaded in the plugged honeycomb body in combination with a maximum soot load allowed, prior to regeneration, that results in an acceptably low pressure drop in the exhaust after-treatment system.

In some conventional plugged honeycomb bodies used in particulate filters (not shown herein), every other channel is plugged at one end in a checkerboard pattern and the opposite channels are plugged at the opposite end, also in a checkerboard pattern. In such conventional plugged honeycomb bodies, 50% of the channels are inlet channels and in each inlet channel, all four walls are shared with neighboring walls of outlet channels. Moreover, in conventional plugged honeycomb bodies, all the inlet channels have a same cross-sectional area as the outlet channels. Therefore, 100% of the inlet walls in the plugged honeycomb body can be considered to be "filtration walls" that are configured to directly filter particulates. When considering an entire plugged honeycomb body of a particulate filter, not every wall need be a filtration wall. For example, a border provided by an outer peripheral skin, which can be less porous than the bulk of the intersecting porous walls of the plugged honeycomb body, may not be a filtration wall.

Some plugged honeycomb bodies provide an increased inlet volume or inlet open frontal area (e.g., $OFA_{IN}$) wherein the cross-sectional area (e.g., size) of the inlet channels is made large relative to the cross-sectional area of the outlet channels in order to provide increased ash storage capacity in the larger inlet channels. Such plugged honeycomb bodies are referred to as having asymmetric channels, or asymmetric channel sizes. While such plugged honeycomb bodies having asymmetric channel configurations provide reduced frequency of regeneration intervals, the extent to which the hydraulic diameter ratio ($OFA_{IN}/OFA_{OUT}$) can be increased is limited by the increase in pressure drop that results as the size of the outlet channels (e.g. the hydraulic diameter of the outlet channels) decreases. The hydraulic diameter of each channel is calculated as four times the cross-sectional area of the channel divided by the perimeter of that channel at that same cross-section.

If the inlet:outlet channel count ratio (number of inlet channels to number of outlet channels) is increased beyond a certain value, the relatively smaller size of the outlet channels can result in a relatively large penalty in pressure drop. In addition, die design and manufacturing becomes more difficult and costly with smaller outlet channels. For example, extrusion dies would comprise small pins to produce the small outlet channels and such small pins may not be well anchored to the die body and may be more likely to break off or bend during normal use. Furthermore, such small outlet channels can become difficult to plug due to their small sizes. Additional complications can arise during extrusion. For example, the green honeycomb extrudate can be more likely to slump in the green state or may even exhibit relatively lower isostatic strength than non-asymmetric honeycombs. In addition to the foregoing, extrusion dies for such asymmetric cell honeycomb bodies tend to be relatively costly and complicated to manufacture, relying entirely on expensive electron discharge machining (EDM) and relatively complicated electrodes.

Other plugged honeycomb bodies can provide an increased ash storage capacity by virtue of a plugging pattern that results in a higher number of inlet channels than outlet channels. One such body has an inlet:outlet channel count ratio of 3:1 (number of inlet channels to number of outlet channels). Some of these honeycomb bodies comprise two types of inlet channels, which are referred to as A-type and B-type inlet channels. In A-type inlet channels, there are two walls shared with neighboring outlet channels. In B-type inlet channels, there is one wall shared with a neighboring outlet channel, wherein the other three walls are shared with other neighboring inlet channels. In this type of plugged honeycomb body, there is one A-type inlet channel and two B-type inlet channels in each repeating unit cell. Thus, this type of plugged honeycomb body employs, on average, 33% of inlet walls for direct filtration. Although this type of plugged honeycomb body provides an increased inlet volume (or area) by about 50% and therefore results in a relatively large increase in ash storage capacity, this type of plugged honeycomb body can suffer from a pressure drop penalty because all the outlet flow is restricted to a small number of relatively small outlet channels.

Plugged honeycomb bodies disclosed herein, when used in particulate filters, reduce the pressure drop of clean particulate filters and can also reduce the pressure drop of soot- and ash-loaded particulate filters. Thus, the interval between soot removal (e.g., regeneration) may be significantly increased.

Furthermore, in contrast to conventional plugged honeycomb bodies, the plugged honeycomb bodies disclosed herein comprise honeycomb structures that help to mitigate the above-described issues by comprising repeating unit cells (repeating groupings of channels) including three or four channels. The three or four channels comprise more inlet channels than outlet channels. Each channel can be formed by four walls, wherein at least one wall of an inlet channel or an outlet channel is intersected midwall by a wall. An area of an outlet channel (measured as the area in transverse cross-section perpendicular to the channel length) is equal to or less than an area of any of the inlet channels (measured as the area in transverse cross-section). Each repeating unit cell may include one and only one outlet channel. Various embodiments disclosed herein include combinations of square and rectangular cells. "Rectangular" as used herein means a quadrilateral with four right angles and two sides of longer length than the other two sides. As used herein, "neighboring channel" refers to a channel, which is directly adjacent (abutting) another channel and shares a common wall between the channels.

In addition to the foregoing, the plugged honeycomb bodies disclosed herein may comprise an increased inlet open frontal area ($OFA_{IN}$). The increased $OFA_{IN}$ may increase the particulate or ash storage capacity of filters containing the plugged honeycomb bodies disclosed herein. In some embodiments, $OFA_{IN}$ of the inlet cells open is $OFA_{IN} \geq 45\%$, in some embodiments $OFA_{IN} \geq 50\%$, in some embodiments $OFA_{IN} \geq 60\%$, and in some embodiments $50\% \leq OFA_{IN} \leq 75\%$. In some embodiments, $OFA_{All}$ of all cells [of inlet cells ($OFA_{IN}$) and outlet cells ($OFA_{OUT}$)] is $\geq 60\%$, in some embodiments, it is $\geq 70\%$, in some embodiments, it is $\geq 80\%$, and in some embodiments it is $\geq 60\%$ and $\leq 90\%$. Some embodiments of the honeycomb bodies may comprise $OFA_{IN}$ that is greater than $OFA_{OUT}$ and the ratio $OFA_{In}/OFA_{Out}$ may be in the range of 1.1 to 5.0.

The honeycomb structures may comprise long straight walls extending between a plurality of repeating unit cells. The long straight walls are formed from long slots in the extrusion dies, which can be formed by wire cut technology. The resulting extrusion dies can have lower manufacturing cost compared to plunged electrical discharge machining (EDM) technology used to manufacture dies comprising asymmetrical cell technology (ACT) designs. Furthermore, the honeycomb bodies and honeycomb structures described herein provide increased flow by enabling more walls of outlet channels to share walls with inlet channels.

Some of the repeating unit cells may comprise large rectangular and smaller rectangular channels, wherein the large rectangular channels enable high ash storage capacity and low pressure drop. Some of the repeating unit cells may comprise larger and smaller squares and/or a combination of squares and rectangles. Some channels in the honeycomb structure are offset, forming brick designs. In some embodiments, the plugged honeycomb bodies provide larger areas of shared walls between inlet channels and outlet channels than the shared walls in plugged honeycomb bodies comprising asymmetric cells.

Honeycomb structures, plugged honeycomb bodies, and honeycomb extrusion dies such as those schematically represented in FIGS. 1-11B can provide one or more of the benefits described above. The plugged honeycomb bodies disclosed herein comprise channels that may be offset from one another, which enable high surface areas of the inlet channels to be shared with the outlet channels. The offset channels also improve air flow through the plugged honeycomb bodies even as the plugged honeycomb bodies accumulate particulates.

Reference is now made to FIG. 1, which schematically illustrates a side cross-sectioned view of an embodiment of an extruder 100 (e.g., a continuous twin-screw extruder). The extruder 100 comprises a barrel 102 comprising a first chamber portion 104 and a second chamber portion 106 formed therein and in communication with each other. The barrel 102 can be monolithic or it can be formed from a plurality of barrel segments connected successively in the longitudinal (e.g., axial) direction. The first chamber portion 104 and the second chamber portion 106 extend through the barrel 102 in the longitudinal direction between an upstream side 108 and a downstream side 110. At the upstream side 108 of the barrel 102, a material supply port 114, which can include a hopper or other material supply structure, may be provided for supplying a batch mixture 116 to the extruder 100. A honeycomb extrusion die 120 is provided at and coupled to a discharge port 122 at the downstream side 110 of the barrel 102 for extruding the batch mixture 116 into a desired shape, such as green honeycomb extrudate 124. The honeycomb extrusion die 120 can be preceded by other structures, such as a generally open cavity, screen/homogenizer (not shown), or the like to facilitate the formation of a steady plug-type flow front before the batch mixture 116 reaches the honeycomb extrusion die 120.

As shown in FIG. 1, a pair of extruder screws are mounted in the barrel 102. A first screw 130 is rotatably mounted at least partially within the first chamber portion 104 and a second screw 132 is rotatably mounted at least partially within the second chamber portion 106. The first screw 130 and the second screw 132 may be arranged generally parallel to each other, as shown, though they may also be arranged at various angles relative to each other. The first screw 130 and the second screw 132 may also be coupled to a driving mechanism outside of the barrel 102 for rotation in the same or different directions. It is to be understood that both the first screw 130 and the second screw 132 may be coupled to a single driving mechanism (not shown) or, as shown, to individual driving mechanisms 136. The first screw 130 and the second screw 132 move the batch mixture 116 through the barrel 102 with pumping and mixing action in an axial direction 140. Further supporting structure (shown dotted) can be provided to support the first screw 130 and the second screw 132 along their lengths. Such support structure can include perforations or holes therein to allow the batch mixture 116 to flow there through.

Figure 2:
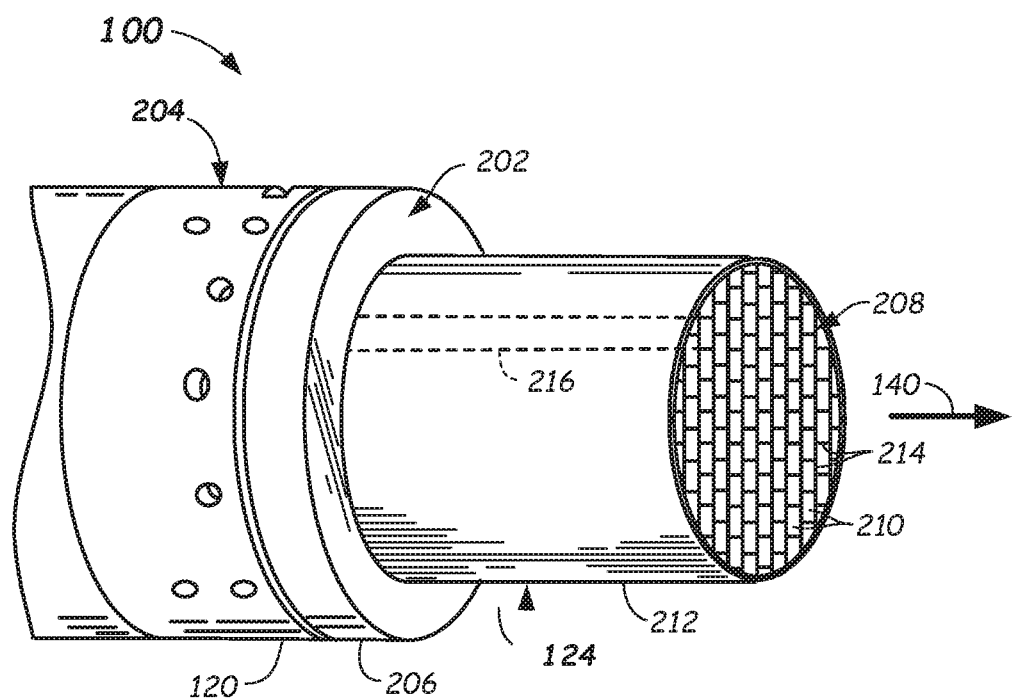
FIG. 2 schematically illustrates a front end of an extruder apparatus and a honeycomb extrudate comprising a honeycomb structure being extruded therefrom according to embodiments of the disclosure.

FIG. 2 is a perspective, schematic illustration showing an end of the extruder 100 and a green honeycomb extrudate 124 being extruded therefrom. The extruder 100 is shown with an extruder front end 202 being where the batch mixture 116 (FIG. 1) exits the extruder 100 as the green honeycomb extrudate 124. An extruder cartridge 204 located proximate the extruder front end 202 can comprise extrusion hardware such as the honeycomb extrusion die 120 and a skin forming mask 206.

The green honeycomb extrudate 124 comprises a first end face 208. The green honeycomb extrudate 124 can also comprise a plurality of channels 210, and an outer peripheral surface 212 comprising a skin. A plurality of intersecting walls 214 can form the channels 210 that extend in the axial direction 140. For example, intersecting walls 214 forming a channel 216 extending in the axial direction 140 are shown by dashed lines for illustration. The cross-section of the first end face 208 of the green honeycomb extrudate 200 depicted in FIG. 2 is circular, but it can have other shapes, such as rectangular, elliptical, race-track shape, square, triangular or tri-lobed, hexagonal, octagonal, asymmetrical, symmetrical, or other desired polygonal shapes, and combinations thereof.

Average cell density of the dried and fired honeycomb bodies produced from the green honeycomb extrudate 124 may be between about 100 and 900 cells per square inch (cpsi) (between about 15.5 and 139.5 cells/cm$^2$). The intersecting walls 214, once dried and fired, may have thicknesses ranging from about 2.0 mils to about 60 mils (about 0.079 mm to about 1.524 mm). For example, the geometries of the green honeycomb extrudate 124, when dried and fired, may have an average cell density of about 400 cpsi with a wall thickness of about 8 mils (a 400/8 configuration) or with and average cell density of about 400 cpsi a wall thickness of about 6 mils (a 400/6 configuration). Other geometries of the honeycomb bodies produced from the green honeycomb extrudate 124 can include, for example, combinations of average cell density/wall thickness of 100/17, 200/12, 200/19, 270/19, 600/4, 400/4, 600/3, 900/3, and the like.

Figure 3:
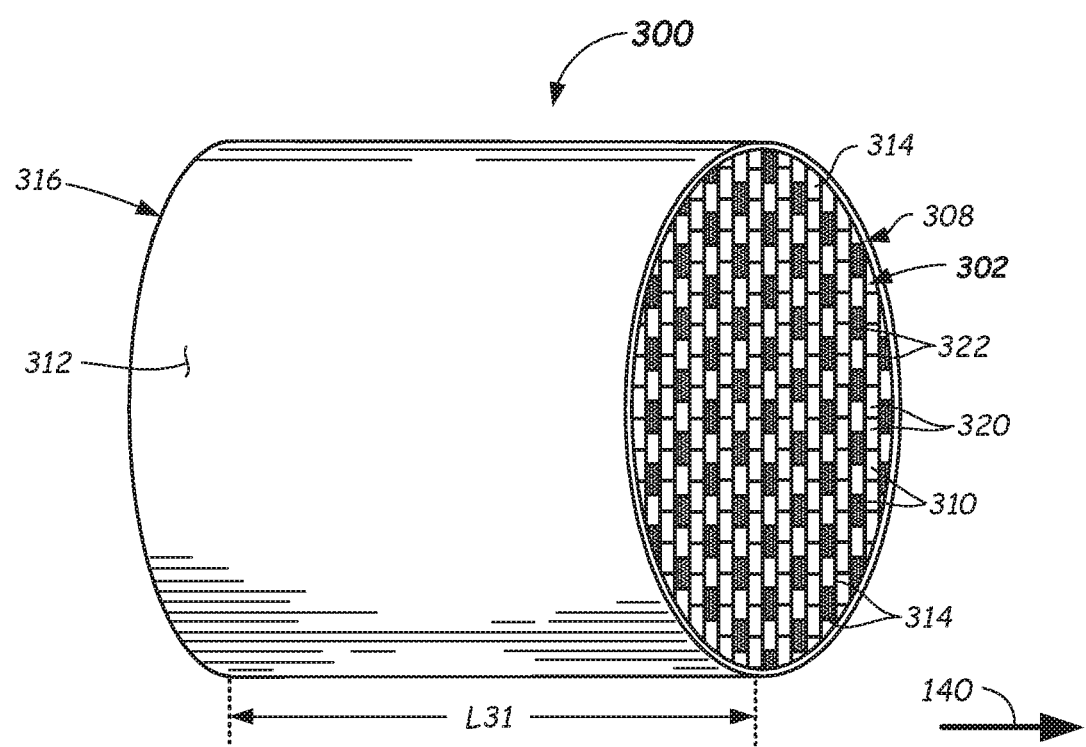
FIG. 3 schematically illustrates an isometric view of a plugged honeycomb body comprising a honeycomb structure comprising repeating unit cells according to embodiments of the disclosure.

Upon exiting the extruder 100 in the axial direction 140, the green honeycomb extrudate 124 may stiffen and may be dried and fired to form a honeycomb body, which then can be plugged to form the plugged honeycomb body 300 as shown in FIG. 3. The honeycomb body 300 comprises an inlet end 308 and an outlet end 316 located opposite the inlet end 308 and comprises a length L31 extending between the inlet end 308 and the outlet end 316. A peripheral skin 312 of the honeycomb body 300 can extend axially between the inlet end 308 and the outlet end 316. The honeycomb body 300 comprises a honeycomb structure 302 at least partially defined by a plurality of porous walls 314 extending between the inlet end 308 and the outlet end 316.

The honeycomb body 300 can be used in a particulate filter wherein the inlet end 308 receives fluid (e.g., exhaust gas) and expels filtered fluid (filtered exhaust gas) out the outlet end 316. A plurality of channels 310 corresponding to the channels 210 (FIG. 2) may extend between the inlet end 308 and the outlet end 316. At least some of the channels 310 can be plugged on either the inlet end 308 or the outlet end 316. Inlet channels 320 are depicted by having no shading when viewed from the inlet end 308 and are plugged at or near the outlet end 316. Outlet channels 322 are depicted by shading as viewed from the inlet end 308 and are plugged at or near the inlet end 308, but are unplugged at the outlet end 316. Fluids, such an exhaust gas, enter the plugged honeycomb body 300 at the inlet channels 320. Because the inlet channels 320 are plugged proximate the outlet end 316, the fluid is forced through the porous walls 314, where it is filtered, and passes through the porous walls 314 to the outlet channels 322. The fluid then exits the plugged honeycomb body 300 via the outlet channels 322. Cells are defined as areas of the channels taken in transverse cross-section normal to the axial direction 140 of the plugged honeycomb body 300. Thus, inlet cells are cross-sectional areas of inlet channels 320 and outlet cells are cross-sectional areas of outlet channels 322.

Figure 4A:
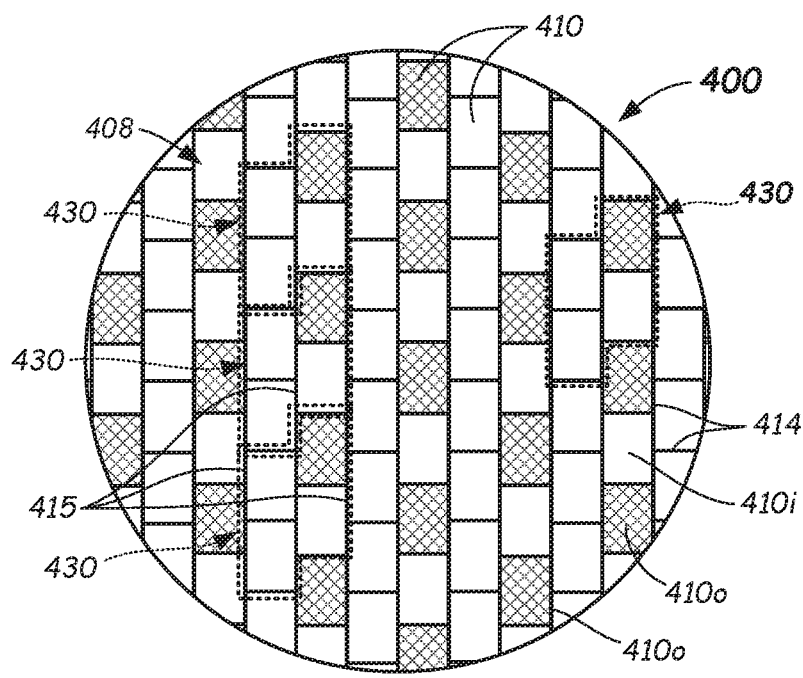
FIG. 4A schematically illustrates an enlarged partial end view of a honeycomb structure within a plugged honeycomb body comprising repeating unit cells according to embodiments of the disclosure.

Reference is now made to FIG. 4A, which schematically illustrates at least a portion of an inlet end 408 of a honeycomb structure 400 configured in a first embodiment. The honeycomb structure 400 may comprise a plurality of channels 410, each formed by four intersecting porous walls 414. The channels 410 depicted in FIG. 4A may be greatly enlarged for illustration purposes. The channels 410 comprise inlet channels 410$i$ and outlet channels 410$o$. As described above, outlet channels 410$o$ may be plugged proximate the inlet end 408 and the inlet channels 410$i$ may be plugged at the opposite end (e.g., outlet end) of the honeycomb structure 400.

Figure 4B:
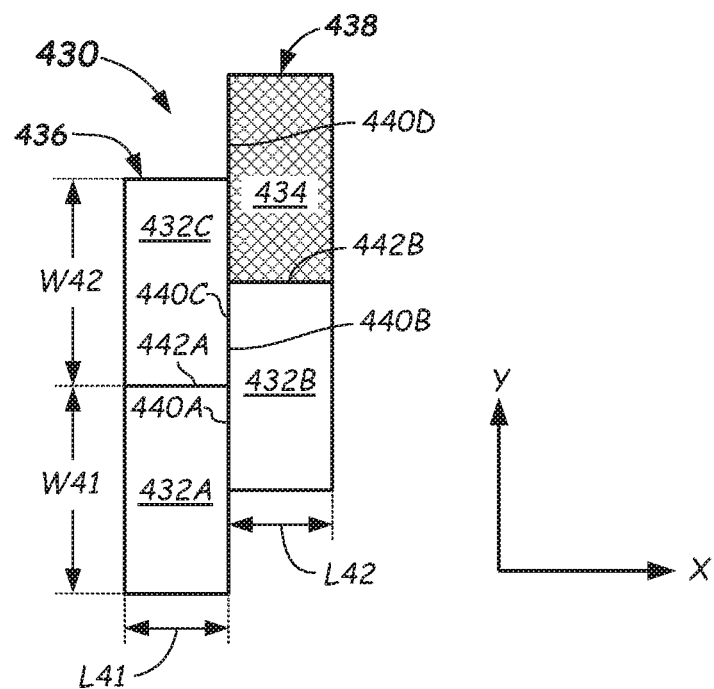
FIG. 4B schematically illustrates an enlarged repeating unit cell within the honeycomb structure of FIG. 4A according to embodiments of the disclosure.

The channels 410 may be arranged as a matrix of repeating unit cells 430. Additional reference is made to FIG. 4B, which schematically illustrates an enlarged end view of a repeating unit cell 430. The repeating unit cell 430 comprises four channels, which may be referred to as individual cells having areas measured in an x-y plane (transverse plane), wherein an x-direction, a y-direction, and the axial direction 140 (e.g., a z-direction) may be orthogonal. The configuration of the repeating unit cell 430 shown in FIGS. 4A and 4B comprises three inlet channels 432A, 432B, and 432C and one outlet channel 434 that is plugged proximate the inlet end 408. The repeating unit cell 430 can be referred to as comprising two groups. A first group 436 can comprise inlet channels 432A and 432C, which are aligned in the y-direction. A second group 438 can comprise inlet channel 432B and the outlet channel 434 and can also be aligned in the y-direction. As shown in FIGS. 4A and 4B, the first group 436 can directly abut the second group 438.

The porous walls forming the channels of the repeating unit cell 430 can be shared between channels. For example, the inlet channel 432A can comprise a wall 440A that is at least partially shared with a wall 440B of the inlet channel 432B. The inlet channel 432C can comprise a wall 440C that is at least partially shared with the wall 440B and a wall 440D of the outlet channel 434. A shared wall can be a single wall or a portion of a single wall that at least partially defines or bounds two adjacent channels. The walls may have transverse thicknesses in a range from 2.0 mils to 8.3 mils (0.051 mm to 0.211 mm).

Channels in the first group 436 and the second group 438 can also share walls. For example, in the depicted embodiment, a first common wall 442A is shared between the inlet channel 432A and the inlet channel 432C. A second common wall 442B is shared between the inlet channel 432B and the outlet channel 434. The first common wall 442A can intersect the wall 440B of the inlet channel 432B. In some embodiments, the first common wall 442A can bisect the wall 440B or intersect the wall 440B at midwall. By midwall, what is meant is anywhere between the ends of wall 440B, such as at the middle, for example. The second common wall 442B can intersect the wall 440C of the inlet channel 432C. In some embodiments, the second common wall 442B can intersect the wall 440C midwall, and may bisect the wall 440C, for example.

The channels in the first group 436 may have lengths L41 extending in the x-direction and the channels in the second group 438 may have lengths L42 extending in the x-direction. In the embodiment depicted in FIGS. 4A and 4B, the lengths L41 and L42 may be equal. Other embodiments described herein have different lengths between channels in different groups. In the embodiment depicted in FIGS. 4A and 4B, each channel in the repeating unit cell 430 has the same width, wherein the inlet channel 432A has a width W41 and the inlet channel 432C has a width W42 extending in the y-direction. The width W41 may be longer than either the length L41 or the length L42, so all the channels in the repeating unit cell 430 may be rectangular (non-square) in transverse cross-section, wherein the transverse cross section is parallel to the x-y plane and normal to the axial direction 140 (FIG. 2).

Additionally, the area (e.g., cross-sectional area) of all the channels in the repeating unit cell 430 in this embodiment may be equal. Thus, the inlet area is three times the outlet area or $OFA_{IN}=3 \times OFA_{OUT}$. In some embodiments, all the channels in the first group 436 are inlet channels. As shown in FIG. 4A, continuous straight line segments 415 extend along walls 414 of at least three repeating unit cells 430. For example, all the walls 414 extending in the y-direction can be continuous over the inlet end 408 of the honeycomb structure 400. Thus, these walls can be constructed by less expensive wire EDM or abrasive disc slotting processes.

Reference is now made to Tables 1-3. Table 1 provides dimensions of six example embodiments of a plugged honeycomb body comprising the honeycomb structure 400 of FIGs. 4A-4B and resulting characteristics thereof. The sample dimensions, including filter sizes, wall porosity, and other dimensions are applicable to other plugged honeycomb bodies described herein. Table 2 provides dimensions and characteristics of a first comparative example and Table 3 provides dimensions and characteristics of a second comparative example. The first comparative example is a traditional ACT pattern and the second comparative example is a traditional 2×2 honeycomb pattern. Neither comparative example includes the offset channel patterns or configuration of the plugged honeycomb bodies described herein. As shown in the Tables, the pressure drop of the embodiment examples provided in Table 1 is less than the comparative examples.

TABLE 1

Dimensions of six example embodiments

| Parameter | Ex. 1 | Ex. 2 | Ex. 3 | Ex. 4 | Ex. 5 | Ex. 6 |
|---|---|---|---|---|---|---|
| L41, inch | 0.0446 | 0.0400 | 0.0350 | 0.0446 | 0.0446 | 0.0446 |
| (mm) | (1.133) | (1.016) | (0.889) | (1.133) | (1.133) | (1.133) |
| L42, inch | 0.0446 | 0.0400 | 0.0350 | 0.0446 | 0.0446 | 0.0446 |
| (mm) | (1.133) | (1.016) | (0.889) | (1.133) | (1.133) | (1.133) |
| W41, inch | 0.0892 | 0.0800 | 0.0700 | 0.0892 | 0.0892 | 0.0892 |
| (mm) | (2.266) | (2.032) | (1.778) | (2.266) | (2.266) | (2.266) |
| W42, inch | 0.0892 | 0.0800 | 0.0700 | 0.0892 | 0.0892 | 0.0892 |
| (mm) | (2.266) | (2.032) | (1.778) | (2.266) | (2.266) | (2.266) |
| L42/L41 | 1 | 1 | 1 | 1 | 1 | 1 |
| W42/L41 | 2 | 2 | 2 | 2 | 2 | 2 |
| W41/W42 | 1 | 1 | 1 | 1 | 1 | 1 |
| W41/L41 | 2 | 2 | 2 | 2 | 2 | 2 |
| W41/L42 | 2 | 2 | 2 | 2 | 2 | 2 |
| Wall thickness, mils | 8.1 | 8.1 | 8.1 | 6 | 4 | 2 |
| (mm) | (0.206) | (0.206) | (0.206) | (0.152) | (0.102) | (0.051) |
| 432A area, in$^2$ | 0.00398 | 0.00320 | 0.00245 | 0.00398 | 0.00398 | 0.00398 |
| (mm$^2$) | (2.57) | (2.06) | (1.58) | (2.57) | (2.57) | (2.57) |
| 432B area, in$^2$ | 0.00398 | 0.00320 | 0.00245 | 0.00398 | 0.00398 | 0.00398 |
| (mm$^2$) | (2.57) | (2.06) | (1.58) | (2.57) | (2.57) | (2.57) |
| 432C area, in$^2$ | 0.00398 | 0.00320 | 0.00245 | 0.00398 | 0.00398 | 0.00398 |
| (mm$^2$) | (2.57) | (2.06) | (1.58) | (2.57) | (2.57) | (2.57) |
| 434 area, in$^2$ | 0.00398 | 0.00320 | 0.00245 | 0.00398 | 0.00398 | 0.00398 |
| (mm$^2$) | (2.57) | (2.06) | (1.58) | (2.57) | (2.57) | (2.57) |
| 434/432B | 1 | 1 | 1 | 1 | 1 | 1 |
| 432C/432A | 1 | 1 | 1 | 1 | 1 | 1 |
| F1 (area fraction of 432A)/all cells | 0.250 | 0.250 | 0.250 | 0.250 | 0.250 | 0.250 |
| F2 (area fraction of 432B)/all cells | 0.250 | 0.250 | 0.250 | 0.250 | 0.250 | 0.250 |
| F3 (area fraction of 432C)/all cells | 0.250 | 0.250 | 0.250 | 0.250 | 0.250 | 0.250 |
| F4 (area fraction of 434)/all cells | 0.250 | 0.250 | 0.250 | 0.250 | 0.250 | 0.250 |
| Open area fraction of all cells open | 0.78 | 0.76 | 0.73 | 0.83 | 0.88 | 0.94 |
| unit cell area, in$^2$ | 0.0205 | 0.0170 | 0.0135 | 0.0193 | 0.0181 | 0.0170 |
| (mm$^2$) | (13.2) | (11) | (8.71) | (12.4) | (11.7) | (11) |
| Inlet OFA, % | 58.2 | 56.6 | 54.6 | 61.9 | 65.9 | 70.2 |
| Inlet/outlet area ratio | 3.00 | 3.00 | 3.00 | 3.00 | 3.00 | 3.00 |
| Cells/ in$^2$ (cpsi base on repeating unit cell) (cells/cm$^2$) | 195 (1260) | 236 (1520) | 297 (1920) | 208 (1340) | 221 (1430) | 235 (1520) |
| Wall porosity, % | 45 | 45 | 45 | 45 | 45 | 45 |

TABLE 1-continued

Dimensions of six example embodiments

| Parameter | Ex. 1 | Ex. 2 | Ex. 3 | Ex. 4 | Ex. 5 | Ex. 6 |
|---|---|---|---|---|---|---|
| Mean Pore Diameter, μm | 14.5 | 14.5 | 14.5 | 14.5 | 14.5 | 14.5 |
| Filter size, length, inch (cm) | 7.5 (19) | 7.5 (19) | 7.5 (19) | 7.5 (19) | 7.5 (19) | 7.5 (19) |
| Filter size, diameter, inch (cm) | 13 (33) | 13 (33) | 13 (33) | 13 (33) | 13 (33) | 13 (33) |
| Gas mass flow rate, Kg/hr | 1700 | 1700 | 1700 | 1700 | 1700 | 1700 |
| Gas temperature, °C. | 380 | 380 | 380 | 380 | 380 | 380 |
| Pressure drop, KPa, [ash = 0 g/L, soot = 0 g/L] | 3.58 | 4.17 | 5.08 | 3.22 | 2.90 | 2.60 |
| Pressure drop, KPa, [ash = 0 g/L, soot = 6 g/L] | 7.90 | 7.84 | 8.11 | 7.05 | 6.29 | 5.59 |
| Pressure drop, KPa, [ash = 73.6 g/L, soot = 0 g/L] | 5.93 | 6.43 | 7.35 | 5.12 | 4.46 | 3.87 |
| Pressure drop, KPa, [ash = 73.6 g/L, soot = 6 g/L] | 21.04 | 20.00 | 19.53 | 17.18 | 14.22 | 11.79 |
| Percent improvement in Pressure drop vs. Comparative Example 1 [ash = 0 g/L, soot = 0 g/L] | 36.0 | 25.5 | 9.1 | 42.3 | 48.1 | 53.5 |
| Percent improvement in Pressure drop vs. Comparative Example 1 [ash = 0 g/L, soot = 6 g/L] | 25.9 | 26.6 | 24.0 | 33.9 | 41.0 | 47.6 |
| Percent improvement in Pressure drop vs. Comparative Example 1 [ash = 73.6 g/L, soot = 0 g/L] | 29.8 | 23.9 | 13.0 | 39.4 | 47.3 | 54.2 |
| Percent improvement in Pressure drop vs. Comparative Example 1 [ash = 73.6 g/L, soot = 6 g/L] | 27.3 | 30.9 | 32.5 | 40.6 | 50.9 | 59.3 |
| Percent improvement in Pressure drop vs. Comparative Example 2 [ash = 0 g/L, soot = 0 g/L] | 17.2 | 3.6 | −17.6 | 25.4 | 32.8 | 39.8 |
| Percent improvement in Pressure drop vs. Comparative Example 2 [ash = 0 g/L, soot = 6 g/L] | 28.7 | 29.3 | 26.9 | 36.4 | 43.3 | 49.6 |
| Percent improvement in Pressure drop vs. Comparative Example 2 [ash = 73.6 g/L, soot = 0 g/L] | 48.6 | 44.3 | 36.3 | 55.6 | 61.4 | 66.5 |
| Percent improvement in Pressure drop vs. Comparative Example 2 [ash = 73.6 g/L, soot = 6 g/L] | 70.6 | 72.0 | 72.7 | 76.0 | 80.1 | 83.5 |

TABLE 2

Comparative Example 1 (ACT configuration)

| Parameter | Comparative Ex. 1 (ACT) |
|---|---|
| Inlet (large) cell wall length, inch (cm) | 0.0504 (0.128) |
| Inlet (large) cell wall width, inch (cm) | 0.0504 (0.128) |
| Outlet (small) cell wall length, inch (cm) | 0.0390 (.0991) |
| Outlet (small) cell wall width, inch (cm) | 0.0390 (.0991) |
| Inlet (large) cell area for each inlet cell, in² (mm²) | 0.00254 (1.06) |
| Outlet (small) cell area for each outlet cell, in² (mm²) | 0.00152 (0.98) |

TABLE 2-continued

Comparative Example 1 (ACT configuration)

| Parameter | Comparative Ex. 1 (ACT) |
|---|---|
| Inlet/outlet area ratio (large cell/small cell) | 1.67 |
| Inlet (large) cell perimeter, inch (mm) | 0.20 (0.51) |
| Outlet (small) cell perimeter, inch (mm) | 0.16 (0.41) |
| Wall thickness, mils (mm) | 8.1 (0.021) |
| Area fraction of large cells/all cells | 0.63 |
| Area fraction of small cells/all cells | 0.37 |
| Unit cell area, in$^2$ (mm$^2$) | 0.01 (6.45) |
| Inlet open frontal area, % | 45.6 |
| Outlet open frontal area, % | 27.3 |
| Open frontal area, all cells open, % | 72.8 |
| cpsi (based on repeating unit cell) (cells/cm$^2$) | 358.9 (2316) |
| Wall porosity, % | 45.0 |
| Mean Pore Diameter, μm | 14.5 |
| Filter size, length, inch (cm) | 7.5 (19) |
| Filter size, diameter, inch (cm) | 13.0 (33) |
| Gas mass flow rate, Kg/hr | 1700 |
| Gas temperature, ° C. | 380 |
| Pressure drop, KPa, [ash = 0 g/L, soot = 0 g/L] | 5.59 |
| Pressure drop, KPa, [ash = 0 g/L, soot = 6 g/L] | 10.67 |
| Pressure drop, KPa, [ash = 73.6 g/L, soot = 0 g/L] | 8.45 |
| Pressure drop, KPa, [ash = 73.6 g/L, soot = 6 g/L] | 28.94 |

TABLE 3

Comparative Example 2 (Standard configuration)

| Parameter | Comparative Example 2 (Std 2 × 2) |
|---|---|
| L1, inch | 0.0445 (0.113) |
| L2, inch | 0.0445 (0.113) |
| W1, inch | 0.0445 (0.113) |
| W2, inch | 0.0445 (0.113) |
| L1/L1 | 1 |
| L2/L1 | 1 |
| W2/L1 | 1 |
| W1/L1 | 1 |
| W1/W2 | 1 |
| Wall thickness, mils (mm) | 8.1 (0.206) |
| A1, in$^2$ (mm$^2$) | 0.00198 (1.28) |
| A2, in$^2$ (mm$^2$) | 0.00198 (1.28) |
| A3, in$^2$ (mm$^2$) | 0.00198 (1.28) |
| A4, in$^2$ (mm$^2$) | 0.00198 (1.28) |
| A1 (cell type: inlet or outlet) | outlet |
| A2 (cell type: inlet or outlet) | inlet |
| A3 (cell type: inlet or outlet) | inlet |
| A4 (cell type: inlet or outlet) | outlet |
| A4/A2 | 1.000 |
| A3/A1 | 1.000 |
| F1 (area fraction of A1)/all cells | 0.25 |
| F2 (area fraction of A2)/all cells | 0.2500 |
| F3 (area fraction of A3)/all cells | 0.3 |
| F4 (area fraction of A4)/all cells | 0.25 |
| Open area fraction of all cells open | 1 |
| unit cell area, in$^2$ (mm$^2$) | 0.0111 (7.16) |
| Inlet OFA, % | 35.8 |
| Inlet/outlet area ratio | 1 |
| cpsi (based on unit cell) | 362 |
| Wall porosity, % | 45 |
| Mean Pore Diameter, μm | 14.5 |
| Filter size, length, inch | 7.5 (19) |
| Filter size, diameter, inch | 13 (33) |
| Gas mass flow rate, Kg/hr | 1700 |
| Gas temperature, ° C. | 380 |
| Pressure drop, KPa, [ash = 0 g/L, soot = 0 g/L] | 4.3 |
| Pressure drop, KPa, [ash = 0 g/L, soot = 6 g/L] | 11.1 |

TABLE 3-continued

Comparative Example 2 (Standard configuration)

| Parameter | Comparative Example 2 (Std 2 × 2) |
|---|---|
| Pressure drop, KPa, [ash = 73.6 g/L, soot = 0 g/L] | 11.5 |
| Pressure drop, KPa, [ash = 73.6 g/L, soot = 6 g/L] | 71.5 |

Figure 5A:
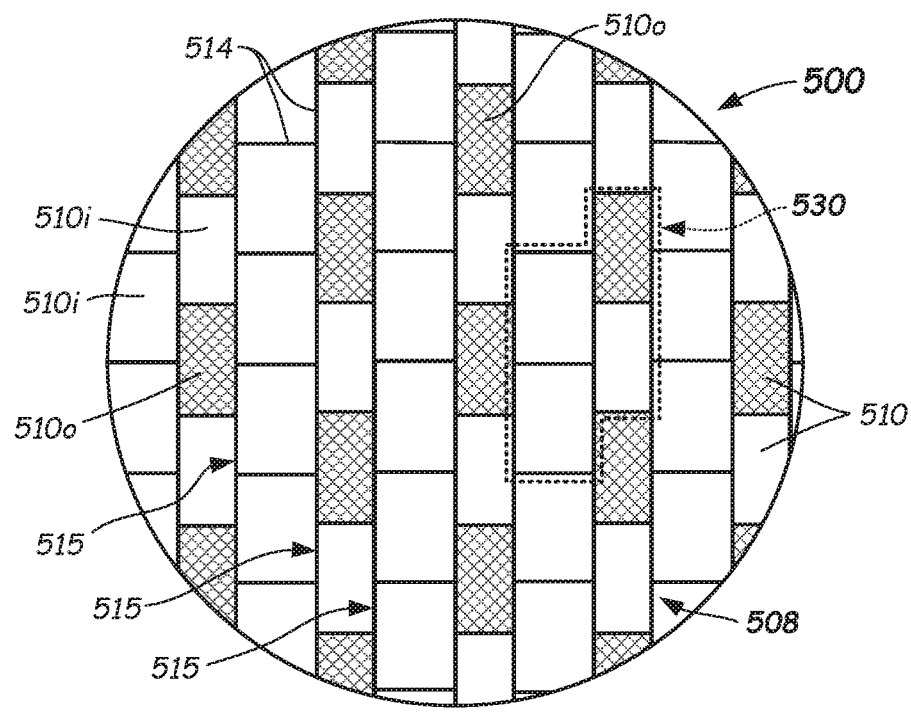
FIG. 5A schematically illustrates an enlarged partial end view of another honeycomb structure within a plugged honeycomb body comprising repeating unit cells according to embodiments of the disclosure.
Figure 5B:
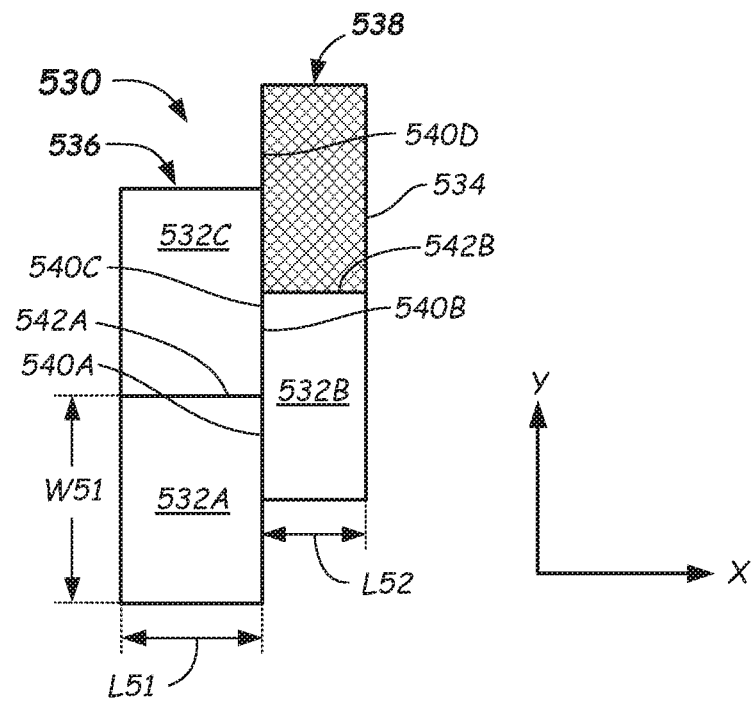
FIG. 5B schematically illustrates an enlarged unit cell within the honeycomb structure of FIG. 5A according to embodiments of the disclosure.

Reference is now made to FIGS. 5A and 5B, which schematically illustrate another embodiment of a matrix of repeating unit cells 530. FIG. 5A schematically illustrates an inlet end 508 of a honeycomb structure 500 configured in another embodiment of a plugged honeycomb body. The honeycomb structure 500 comprises a plurality of intersecting porous walls 514 that form channels 510. The channels 510 can comprise inlet channels 510i and outlet channels 510o, wherein the outlet channels 510o can be plugged proximate the inlet end 508 and the inlet channels 510i can be plugged at the opposite end (e.g., outlet end) of the plugged honeycomb body comprising the honeycomb structure 500. Each of the inlet channels 510i and outlet channels 510o can be formed by four intersecting porous walls 514.

The inlet channels 510i and outlet channels 510o can be arranged as a matrix of repeating unit cells 530. Additional reference is made to FIG. 5B, which schematically illustrates an enlarged view of a repeating unit cell 530. The repeating unit cell 530 can comprise four channels. The configuration of the repeating unit cell 530 schematically illustrated in FIGS. 5A and 5B can comprise three inlet channels 532A, 532B, and 532C and one outlet channel 534 that is plugged proximate the inlet end 508. The repeating unit cell 530 can be referred to as including two groups. A first group 536 can comprise inlet channels 532A and 532C, which are aligned in the y-direction. A second group 538 can comprise inlet channel 532B and the outlet channel 534 and can also be aligned in the y-direction. As shown in FIGS. 5A and 5B, the first group 536 can directly abut the second group 538.

The walls 514 forming the channels 510 of the repeating unit cell 530 can be shared between channels. For example, the inlet channel 532A may comprise a wall 540A that is at least partially shared with a wall 540B of the inlet channel 532B. The inlet channel 532C may comprise a wall 540C that is at least partially shared with the wall 540B of the inlet channel 532B and a wall 540D of the outlet channel 534.

Channels in the first group 536 and the second group 538 can also share walls. A first common wall 542A can be shared between the inlet channel 532A and the inlet channel 532C. A second common wall 542B can be shared between the inlet channel 532B and the outlet channel 534. The first common wall 542A can intersect the wall 540B of the inlet channel 532B. For example, the first common wall 542A can bisect the wall 540B or intersect the wall 540B midwall. Midwall, as used herein in all embodiments, is as described above. The second common wall 542B can intersect the wall 540C midwall or bisect the wall 540C, for example.

The channels in the first group 536 can have lengths L51 extending in the x-direction and the channels in the second group 538 can have lengths L52 extending in the x-direction. In the embodiment depicted in FIGS. 5A and 5B, the lengths L51 can be greater than the lengths L52. Each channel in the repeating unit cell 530 may have the same width W51 extending in the y-direction. The width W51 may be greater than both the length L51 and the length L52 and all the channels in the repeating unit cell 530 may be rectangular in transverse cross-section. In some embodiments, the width W51 is twice as long or about twice as long as the length L52. The areas (e.g., transverse cross-sectional areas) of all the channels in the first group 536 can be equal to each other and the areas of the channels in the second group 538 can be equal to each other. The areas of the channels in the first group 536 can be greater than the areas of channels in the second group 538. Based on the above-described areas, the inlet area is more than three times greater than the outlet area (e.g., 5 times as shown). For example, $OFA_{IN}$ is greater than three times $OFA_{OUT}$. As shown in FIG. 5A, continuous line segments 515 extend along walls 514 of at least three of the repeating unit cells 530 arranged end to end. For example, like in the previous embodiment, all the walls 514 extending in the y-direction can be continuous over the inlet end 508 of the honeycomb structure 500 and can extend from one portion of the skin 312 to another portion of the skin 312 in a plugged honeycomb body 312 comprising the honeycomb structure 500.

Figure 6A:
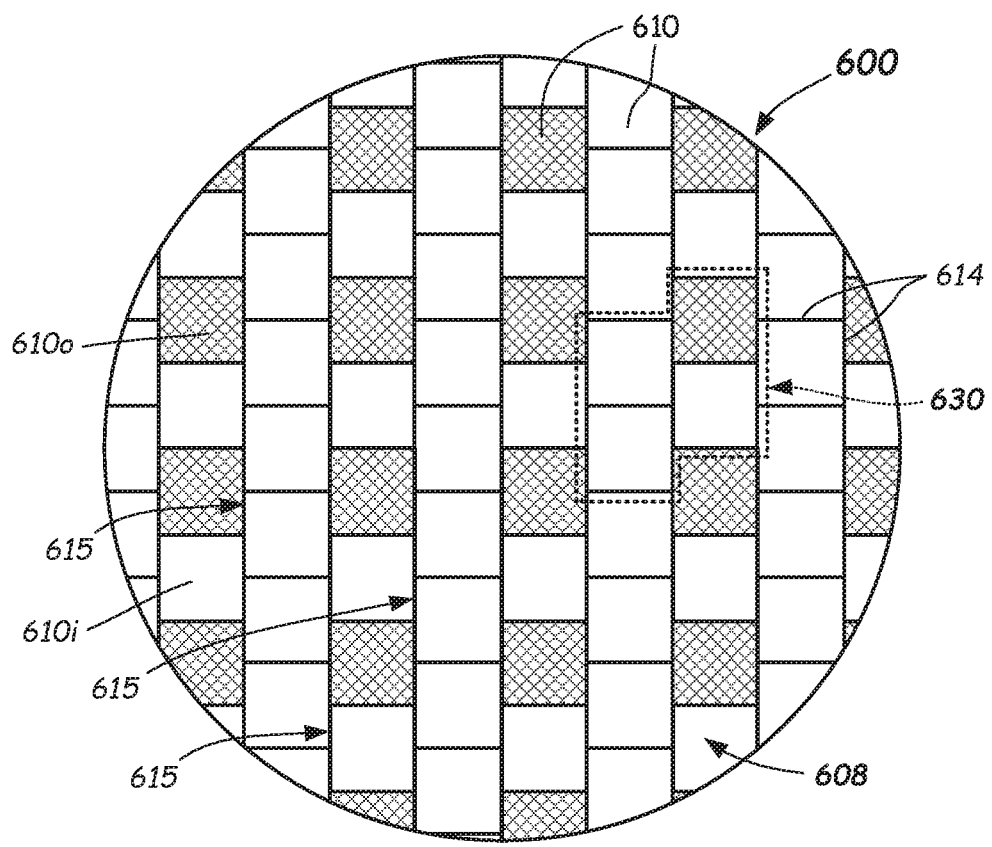
FIG. 6A schematically illustrates an enlarged partial end view of another honeycomb structure within a plugged honeycomb body comprising repeating unit cells according to embodiments of the disclosure.
Figure 6B:
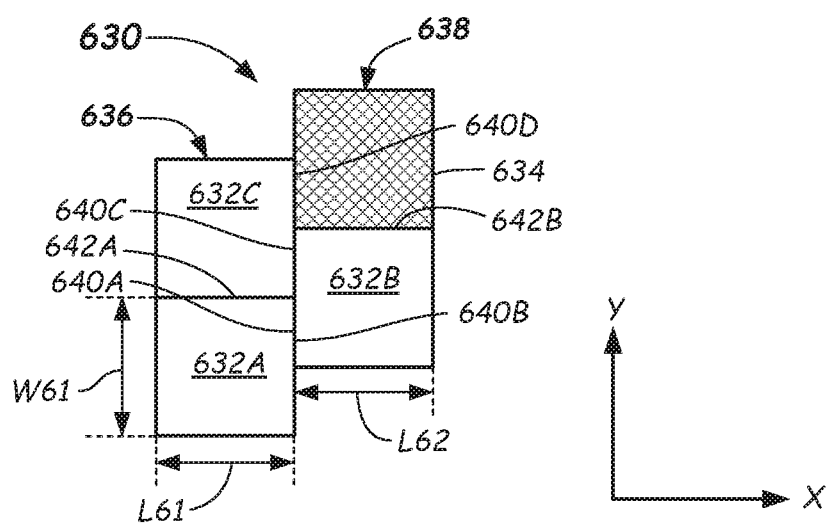
FIG. 6B schematically illustrates an enlarged repeating unit cell within the honeycomb structure of FIG. 6A according to embodiments of the disclosure.

Reference is now made to FIGS. 6A and 6B, which schematically illustrate an embodiment of a matrix of repeating unit cells 630 wherein all the channels in the repeating unit cells 630 are square or substantially square and have equal or substantially equal transverse cross-sectional areas. The term, "substantially square" includes four-sided shapes wherein the lengths of all the sides are within 10% of each other and the angles of the vertices are between 85° and 95°. The term, "substantially equal transverse cross-sectional areas" includes two or more areas that are within 15% of each other. FIG. 6A schematically illustrates at least a portion of an inlet end 608 of a honeycomb structure 600. The honeycomb structure 600 comprises a plurality of intersecting porous walls 614 that form a plurality of channels 610. The channels 610 comprise inlet channels 610i and outlet channels 610o, wherein the outlet channels 610o can be plugged proximate the inlet end 608 end and the inlet channels 610i can be plugged at the opposite end (e.g., outlet end) of plugged honeycomb body comprising the honeycomb structure 600. Each of the inlet channels 610i and outlet channels 610o can be formed by four intersecting porous walls 614.

The inlet channels 610i and the outlet channels 610o can be arranged as a matrix of repeating unit cells 630 as shown in FIG. 6B. The configuration of the repeating unit cell 630 shown in FIGS. 6A and 6B can comprise three inlet channels 632A, 632B, and 632C and one outlet channel 634 that is plugged proximate the inlet end 608. The repeating unit cell 630 can be referred to as including two groups. A first group 636 can comprise inlet channels 632A and 632C, which can be aligned in the y-direction. A second group 638 can comprise the inlet channel 632B and the outlet channel 634 and can also be aligned in the y-direction. As shown in FIGS. 6A and 6B, the first group 636 can directly abut the second group 638.

The walls forming the channels of the repeating unit cell 630 can be shared between channels. For example, the inlet channel 632A can comprise a wall 640A that is at least partially shared with a wall 640B of the inlet channel 632B. The inlet channel 632C can comprise a wall 640C that is at least partially shared with the wall 640B and a wall 640D of the outlet channel 634.

Channels in the first group 636 and the second group 638 can also share walls. A first common wall 642A can be shared between the inlet channel 632A and the inlet channel 632C. A second common wall 642B can be shared between the inlet channel 632B and the outlet channel 634. The first common wall 642A intersects the wall 640B of the inlet channel 632B. In some embodiments, the first common wall 642A can intersect the wall 640B, such as bisecting the wall 640B and/or intersecting the wall 640B midwall. The second common wall 642B can intersect the wall 640D of the outlet channel 634, such as bisecting the wall 640D and/or intersecting the wall 640D midwall.

The channels in the first group 636 can have lengths L61 extending in the x-direction and the channels in the second group 638 can have lengths L62 extending in the x-direction. In the embodiment depicted in FIGS. 6A and 6B, the length L61 is equal to or substantially equal to the length L62. Each channel in the unit cell 630 can have the same width W61 extending in the y-direction. In the embodiment of FIGS. 6A and 6B, all the channels of the unit cell 630 are square or substantially square, so the length L61, the length L62, and width W61 are all equal or substantially equal. The geometries of the channels 610 provide areas of the channels that are equal or substantially equal. Thus, the inlet area is three times the outlet area. For example, $OFA_{IN}=3\times OFA_{OUT}$. As shown in FIG. 6A, continuous line segments 615 extend along walls 614 of at least three adjacent repeating unit cells 630. For example, all the walls 614 extending in the y-direction can be continuous over some or all of an inlet end 608 of a plugged honeycomb body comprising the honeycomb structure 600.

Figure 7A:
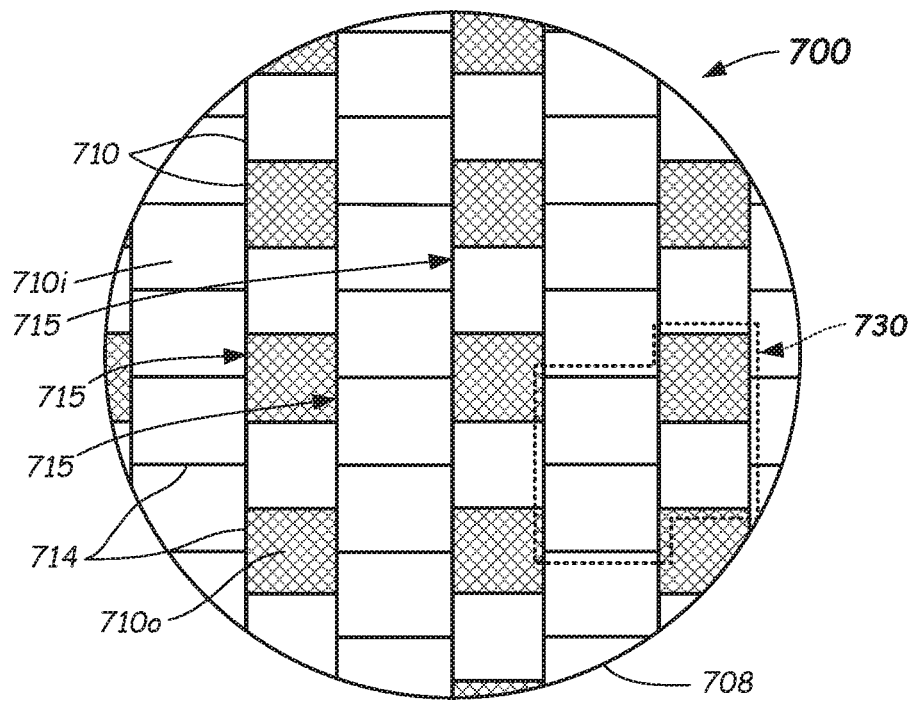
FIG. 7A schematically illustrates an enlarged partial end view of another honeycomb structure within a plugged honeycomb body comprising repeating unit cells according to embodiments of the disclosure.
Figure 7B:
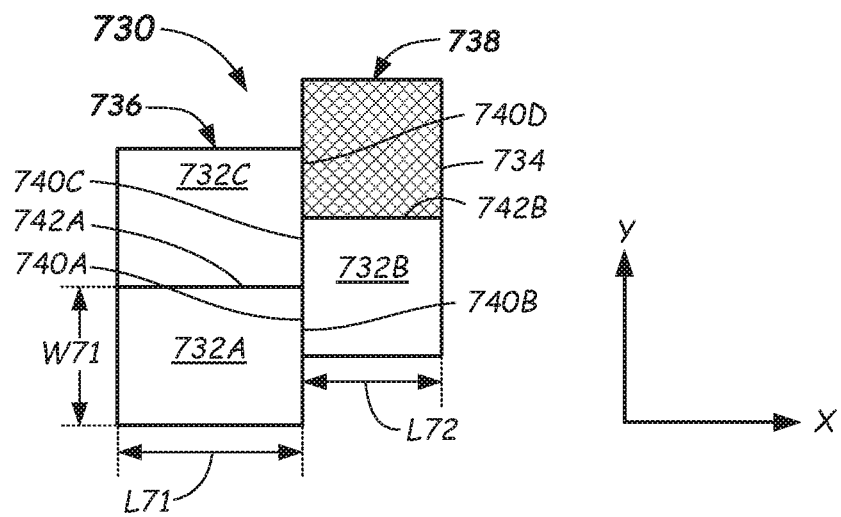
FIG. 7B schematically illustrates an enlarged repeating unit cell within the honeycomb structure of FIG. 7A according to embodiments of the disclosure.

Reference is now made to FIGS. 7A and 7B, which depict another embodiment of a matrix of repeating unit cells 730 wherein all the channels in a first group 736 are rectangular and all channels in a second group 738 are square or substantially square. The honeycomb structure 700 comprises a plurality of intersecting porous walls 714 that form inlet channels 710i and outlet channels 710o, wherein the outlet channels 710o may be plugged proximate the inlet end 708 and the inlet channels 710i may be plugged at the opposite end (e.g., outlet) of the honeycomb structure 700. The inlet channels 710i and outlet channels 710o may be formed by four intersecting porous walls 714.

The inlet channels 710i and outlet channels 710o can be arranged as a matrix of repeating unit cells 730 as shown in FIG. 7B. The configuration of the repeating unit cell 730 shown in FIGS. 7A and 7B can comprise three inlet channels 732A, 732B, and 732C and one outlet channel 734 that is plugged proximate the inlet end 708. The repeating unit cell 730 can be referred to as comprising two groups. A first group 736 can comprise inlet channels 732A and 732C, which can be aligned in the y-direction. A second group 738 can comprise inlet channel 732B and the outlet channel 734 and can also be aligned in the y-direction. As shown in FIGS. 7A and 7B, the first group 736 can directly abut the second group 738.

The walls forming the channels of the repeating unit cell 730 can be shared between channels. For example, the inlet channel 732A can comprise a wall 740A that is at least partially shared with a wall 740B of the inlet channel 732B. The inlet channel 732C can comprise a wall 740C that is at least partially shared with the wall 740B and a wall 740D of the outlet channel 734.

Channels in the first group 736 and the second group 738 can also share walls. For example, a first common wall 742A can be shared between the inlet channel 732A and the inlet channel 732C. A second common wall 742B can be shared between the inlet channel 732B and the outlet channel 734. The first common wall 742A can intersect the wall 740B of the inlet channel 732B. The second common wall 742B can bisect the wall 740C of the inlet channel 732C and or intersect the wall 740C midwall, for example.

The channels in the first group 736 may have lengths L71 extending in the x-direction and the channels in the second group 738 may have lengths L72 extending in the x-direction. In the embodiment depicted in FIGS. 7A and 7B, the length L71 can be greater than the length L72. Each channel in the unit cell 730 may have the same width W71 extending in the y-direction. In some embodiments, all the channels in the first group 736 may be inlet channels. In some embodiments, all the channels in the second group 738 may be square or substantially square.

The geometries of the channels 710 provide for rectangular channels in the first group 736 and square channels in the second group 738, wherein the areas of the rectangles in the first group 736 are greater than the areas of the squares in the second group 738. Thus, the inlet area is greater than three times the outlet area or, $OFA_{IN} \geq 3 \times OFA_{OUT}$. As shown in FIG. 7A, continuous line segments 715 extend along walls 714 of at least three repeating unit cells 730. For example, all the walls 714 extending in the y-direction can be continuous over the inlet end 708 of the honeycomb structure 700, and may can be continuous over the entire matrix of the plugged honeycomb body.

Figure 8A:
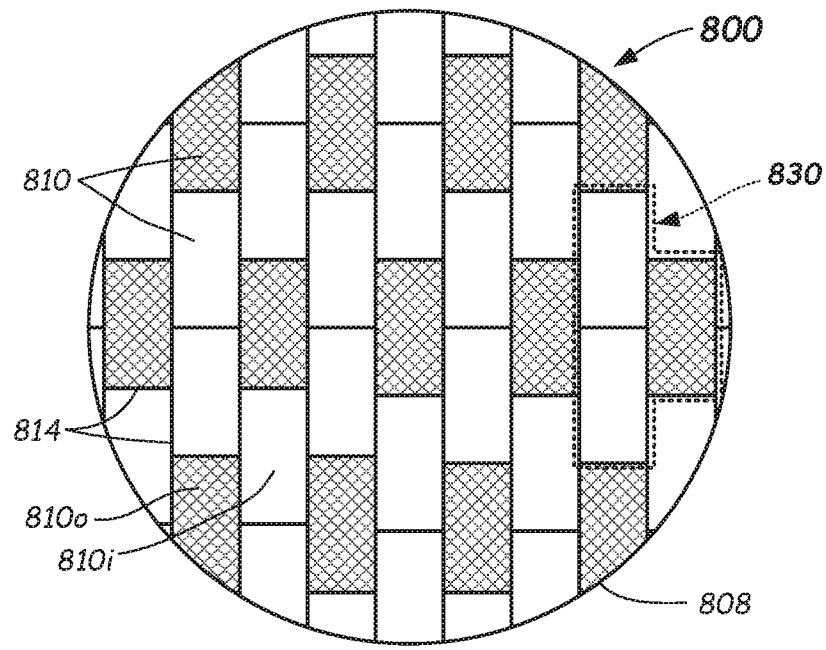
FIG. 8A schematically illustrates an enlarged partial end view of another honeycomb structure within a plugged honeycomb body comprising repeating unit cells according to embodiments of the disclosure.
Figure 8B:
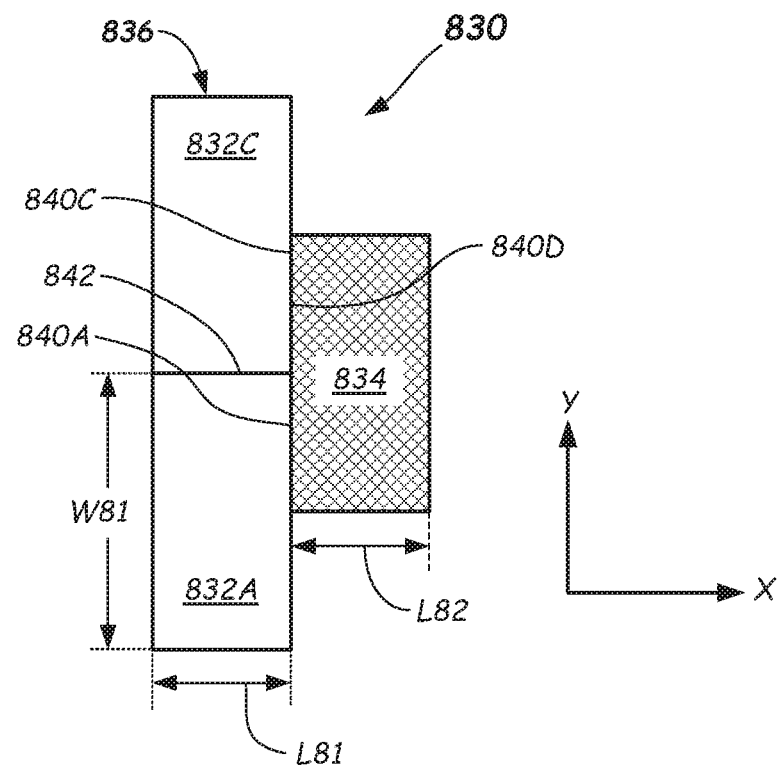
FIG. 8B schematically illustrates an enlarged repeating unit cell within the honeycomb structure of FIG. 8A according to embodiments of the disclosure.

Reference is now made to FIGS. 8A and 8B, which show another embodiment of a honeycomb structure 800 wherein the repeating unit cell 830 comprises two inlet channels 832A and 832C and one outlet channel 834. All the channels of the repeating unit cell 830 can be rectangular and can have the same area or substantially the same area. The honeycomb structure 800 comprises a plurality of intersecting porous walls 814 that form channels 810 comprising inlet channels 810$i$ and outlet channels 810$o$, wherein the outlet channels 810$o$ can be plugged proximate the inlet end 808 and the inlet channels 810$i$ can be plugged at the opposite end (e.g., outlet) of the honeycomb structure 800. The channels 810 can be formed by four intersecting porous walls 814.

The inlet channels 810$i$ and the outlet channels 810$o$ can be arranged as a matrix of repeating unit cells 830 as shown in FIG. 8B. The configuration of the repeating unit cell 830 shown in FIGS. 8A and 8B can include two inlet channels 832A and 832C and one outlet channel 834 that is plugged proximate the inlet end 808. The repeating unit cell 830 can be referred to as including a group 836 that can comprise inlet channels 832A and 832C, which are aligned in the y-direction. The outlet channel 834 and can abut the group 836.

The walls forming the channels of the repeating unit cell 830 can be shared between channels. For example, the inlet channel 832A may comprise a wall 840A that is at least partially shared with a wall 840D of the outlet channel 834. The inlet channel 832C can comprise a wall 840C that is also at least partially shared with the wall 840D of the outlet channel 834.

Channels in the group 836 and the outlet channel 834 may also share walls. For example, a common wall 842 can be shared between the inlet channel 832A and the inlet channel 832C. The common wall 842 can intersect the wall 840D of the outlet channel 834. In some embodiments, the common wall 842 can bisect the wall 840D of the outlet channel 834 and/or intersect the wall 840D midwall, for example.

The channels in the group 836 can have lengths L81 extending in the x-direction and the outlet channel 834 can have a length L82 extending in the x-direction. In the embodiment depicted in FIGS. 8A and 8B, the length L81 is equal to or substantially equal to the length L82. Each channel in the repeating unit cell 830 may have the same width W81 extending in the y-direction. In some embodiments, the width W81 may be twice as long as the length L81. Accordingly, the areas of the channels of the repeating unit cell 830 are the same or substantially the same and there are two inlet channels 810$i$ for every outlet channel 810$o$. Thus, the inlet area is twice the outlet area or, $OFA_{IN}=2 \times OFA_{OUT}$. As shown in FIG. 8A, continuous line segments 815 extend along walls 814 of at least three repeating unit cells 830. For example, all the walls 814 extending in the y-direction can be continuous over the inlet end 808 of the honeycomb structure 800, and may be continuous over the inlet end of a plugged honeycomb body comprising the honeycomb structure 800, Reference is now made to FIGS. 9A and 9B, which show another embodiment of a honeycomb structure 900 wherein the repeating unit cell 930 comprises two inlet channels 932A and 932C and one outlet channel 934. All the channels of the repeating unit cell 930 can be rectangular and may have equal or substantially equal areas. The honeycomb structure 900 comprises a plurality of intersecting porous walls 914 that form channels 910. The channels 910 can comprise inlet channels 910$i$ and outlet channels 910$o$, wherein the outlet channels 910$o$ may be plugged proximate the inlet 908 and the inlet channels 910$i$ can be plugged at the opposite end (e.g., outlet) of the honeycomb structure 900. The inlet channels 910$i$ and outlet channels 910$o$ can be formed by four intersecting porous walls 914.

Figure 9A:
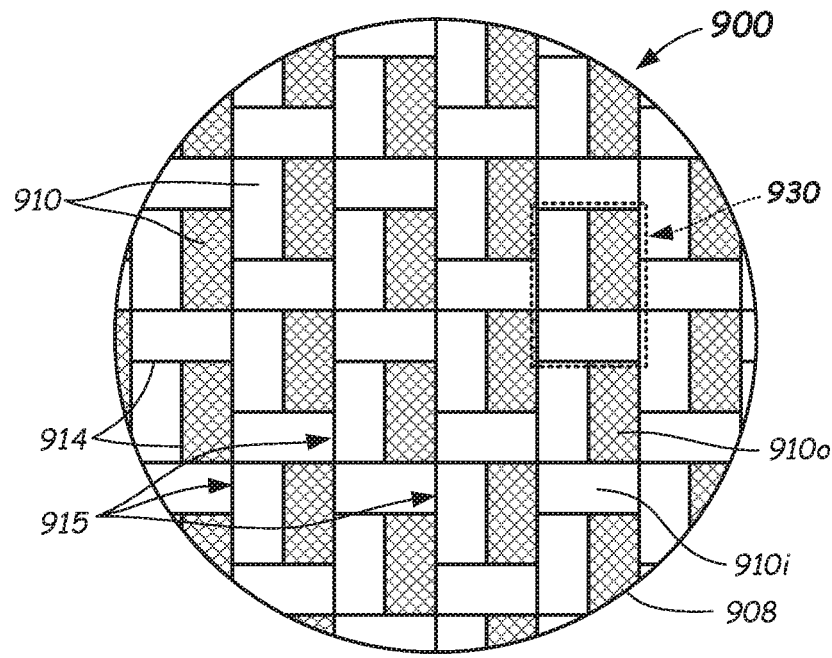
FIG. 9A schematically illustrates an enlarged partial end view of another honeycomb structure within a plugged honeycomb body comprising repeating unit cells according to embodiments of the disclosure.
Figure 9B:
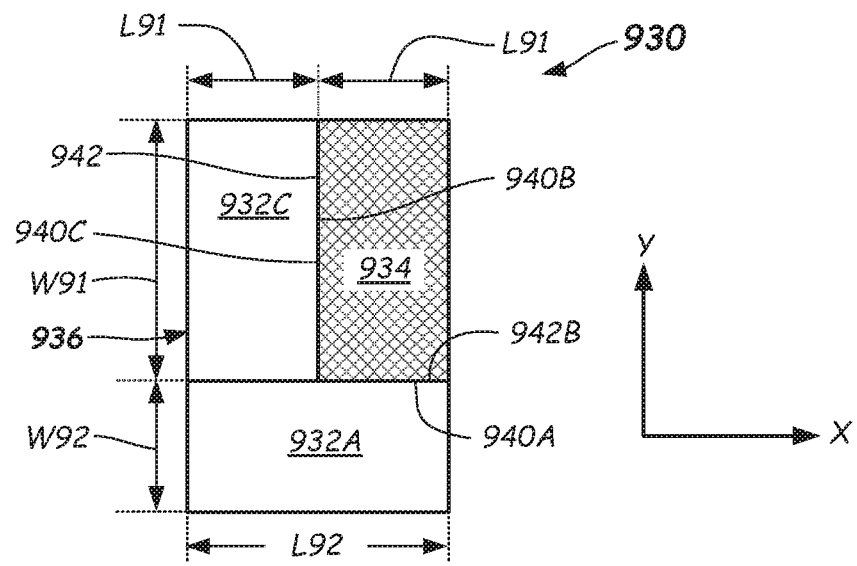
FIG. 9B schematically illustrates an enlarged repeating unit cell within the honeycomb structure of FIG. 9A according to embodiments of the disclosure.

The channels 910 can be arranged as a matrix of repeating unit cells 930 as shown in FIG. 9B. The configuration of the repeating unit cell 930 shown in FIGS. 9A and 9B can comprise two inlet channels 932A and 932C and one outlet channel 934 that is plugged proximate the inlet 908. The repeating unit cell 930 may be referred to as including a configuration where a group 936 can comprise inlet channels 932A and 932C. The outlet channel 934 and can directly abut the group 936. As shown in FIGS. 9A and 9B, the group 936 can at least partially surround the outlet channel 934.

The walls forming the channels of the unit cell 930 can be shared between channels. For example, the inlet channel 932A can comprise a wall 940A that is at least partially shared with a wall 942B of the outlet channel 934. The inlet channel 932C can comprise a wall 940C that is also at least partially shared with the wall 940D of the outlet channel 934.

The wall 940B and the wall 940C may be a common wall 942 shared between the inlet channel 932C and the outlet channel 934. The common wall 942 may intersect the wall 940A of the inlet channel 932A. In some embodiments, the common wall 942 may bisect the wall 940A of the outlet channel 934 and/or intersect the wall 940A midwall, for example.

The inlet channel 932C and the outlet channel 934 can have lengths L91 extending in the x-direction and the inlet channel 932A can have a length L92 extending in the x-direction. In the embodiment depicted in FIGS. 9A and 9B, the length L91 can be twice as long as the length L92. The inlet channel 932A can have a width W92 extending in the y-direction. The inlet channel 932C and the outlet channel 934 can have a width W91 extending in the y-direction. In some embodiments, the width W91 may be twice as long as the width W92. The length L91 may be equal to or substantially equal to the width W92 and the width W91 may be equal to or substantially equal to the length L92. Accordingly, the areas of all the channels in the unit cell 830 are equal or substantially equal. Because there are two inlet channels 910$i$ for every outlet channel 910$o$, the inlet area is twice the outlet area or, $OFA_{IN}=2 \times OFA_{OUT}$. As shown in FIG. 9A, continuous line segments 915 extend along walls 914 of at least three repeating unit cells 930. For example, all the walls 914 extending in the y-direction are continuous over the inlet end 908 of the honeycomb structure 900, and can be continuous over the inlet end of a plugged honeycomb body comprising the honeycomb structure 900.

Figure 10A:
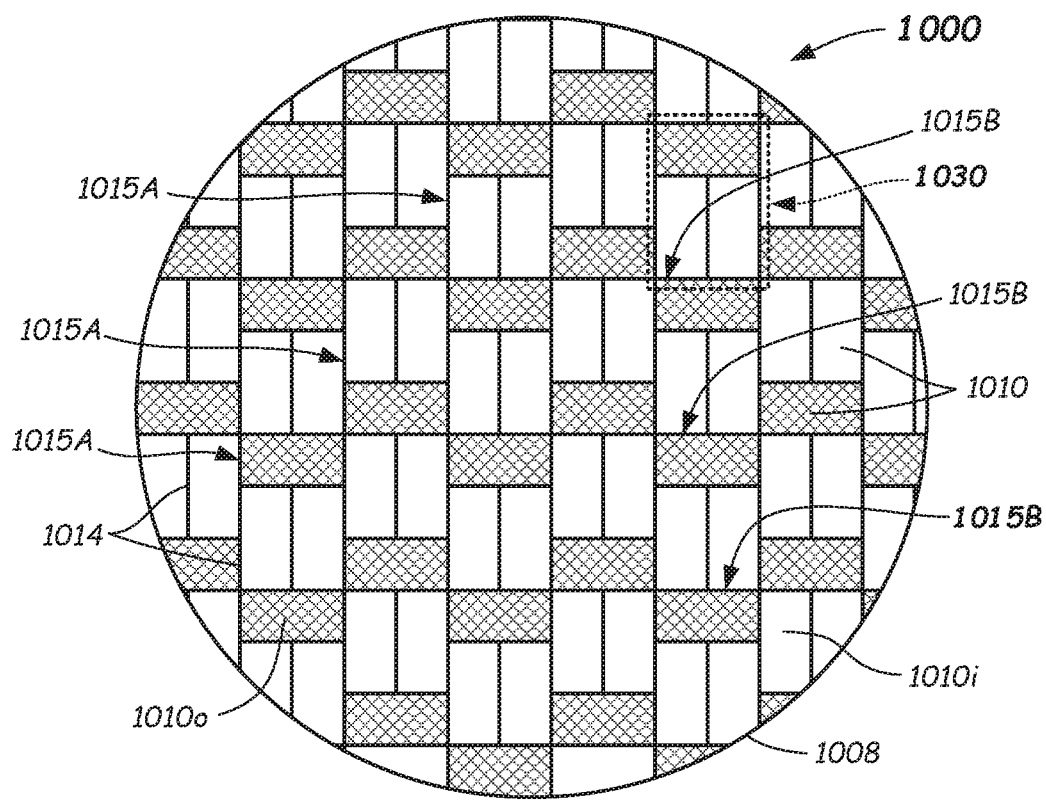
FIG. 10A schematically illustrates an enlarged partial end view of another honeycomb structure within a plugged honeycomb body comprising repeating unit cells according to embodiments of the disclosure.
Figure 10B:
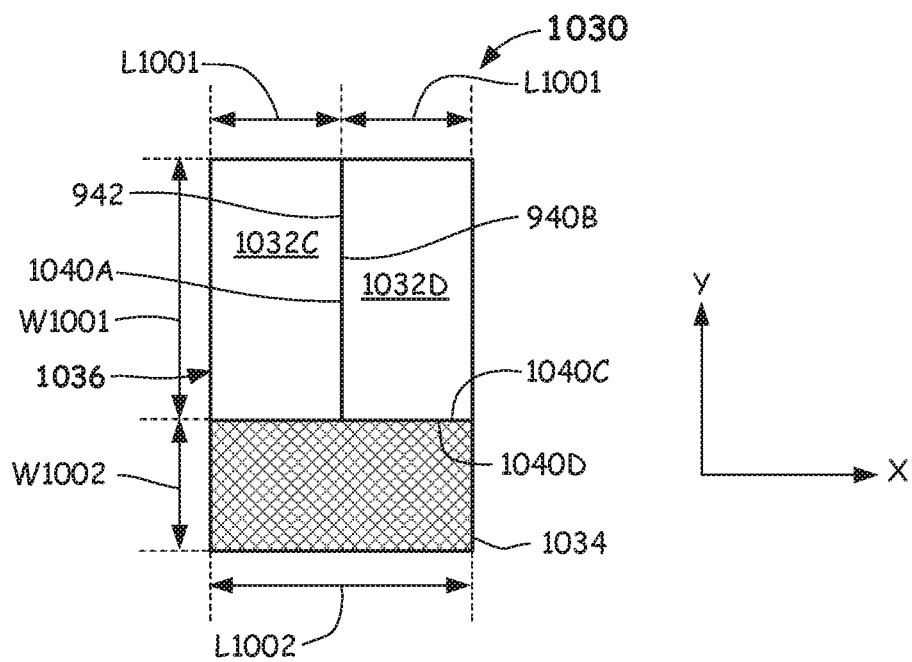
FIG. 10B schematically illustrates an enlarged repeating unit cell within the honeycomb structure of FIG. 10A according to embodiments of the disclosure.

Reference is now made to FIGS. 10A and 10B, which show an embodiment of a honeycomb structure 1000 wherein repeating unit cells 1030 comprise two inlet channels 1032C and 1032D and one outlet channel 1034. All the channels of the repeating unit cell 1030 can be rectangular. The honeycomb structure 1000 can comprise a plurality of intersecting porous walls 1014 that can form channels 1010. The channels 1010 can comprise inlet channels 1010$i$ and outlet channels 1010$o$, wherein the outlet channels 1010$o$ can be plugged proximate the inlet end 1008 and the inlet channels 1010$i$ can be plugged at the opposite end (e.g., outlet) of the honeycomb structure 1000. The inlet channels 1010$i$ and outlet channels 1010$o$ can be formed by four intersecting porous walls 1014.

The inlet channels 1010$i$ and the outlet channels 1010$o$ can be arranged as a matrix of repeating unit cells 1030 as shown in FIG. 10A. The configuration of the repeating unit cell 1030 shown in FIGS. 10A and 10B can comprise two inlet channels 1032C and 1032D and one outlet channel 1034 that is plugged proximate the inlet end 1008. The repeating unit cell 1030 can be referred to as comprising a group. The group 1036 can comprise inlet channels 1032C and 1032D. The outlet channel 1034 can directly abut the group 1036.

The walls forming the channels of the unit cell 1030 may be shared between channels. For example, the inlet channel 1032C and the inlet channel 1032D can comprise a wall 1040A that is at least partially shared between them. The inlet channel 1032C and the inlet channel 1032D can comprise a wall 1040C that is at least partially shared with a wall 1040D of the outlet channel 1034. The wall 1040A can intersect the wall 1040C midwall, for example. In some embodiments, the wall 1040A can bisect the wall 1040C.

The inlet channel 1032C and the inlet channel 1032D can have lengths L1001 extending in the x-direction and the outlet channel 1034 can have a length L1002 extending in the x-direction. In the embodiment depicted in FIGS. 10A and 10B, the length L1001 may be twice as long as the length L1002. The outlet channel 1034 may have a width W1002 extending in the y-direction. The inlet channel 1032C and the inlet channel 1032D may have a width W1001 extending in the y-direction. In some embodiments, the width W1001 can be twice as long as the width W1002. The length L1001 can be equal to the width W1002 and the width W1001 may be equal to or substantially equal to the length L1002.

The geometries of the channels 1010 can provide for the channels 910 having equal areas or substantially equal areas. Because there are two inlet channels 1010$i$ for every outlet channel 1010$o$, the inlet area is twice the outlet area, or $OFA_{IN} = 2 \times OFA_{OUT}$. As shown in FIG. 10A, continuous line segments 1015A, 1015B extend along walls 1014 of at least three repeating unit cells 1030. For example, all the walls 1014 extending in the y-direction and the x-direction are continuous over the inlet end 1008 of the honeycomb structure 1000, and can likewise be continuous over the inlet end of a plugged honeycomb body comprising the honeycomb structure 1000.

Figure 11A:
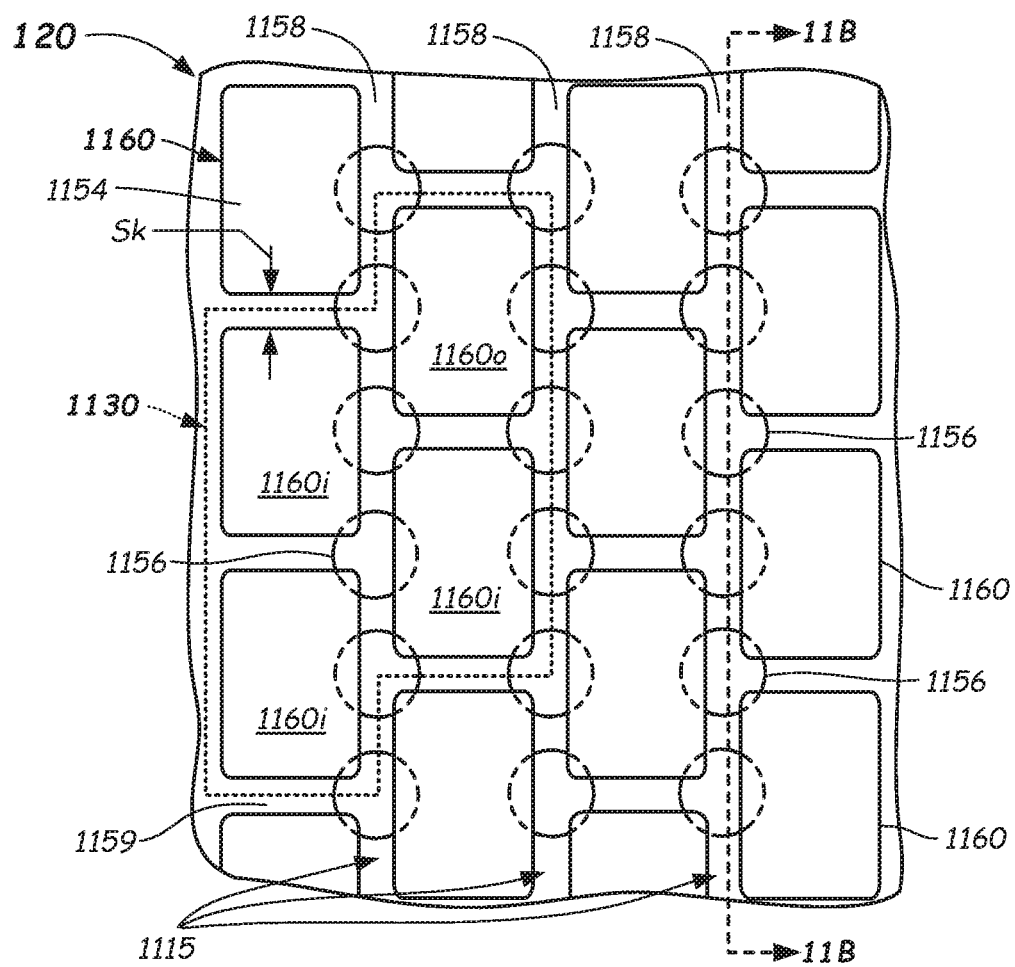
FIG. 11A schematically illustrates a partial front view of a honeycomb extrusion die configured to manufacture the honeycomb structures disclosed herein according to embodiments of the disclosure.
Figure 11B:
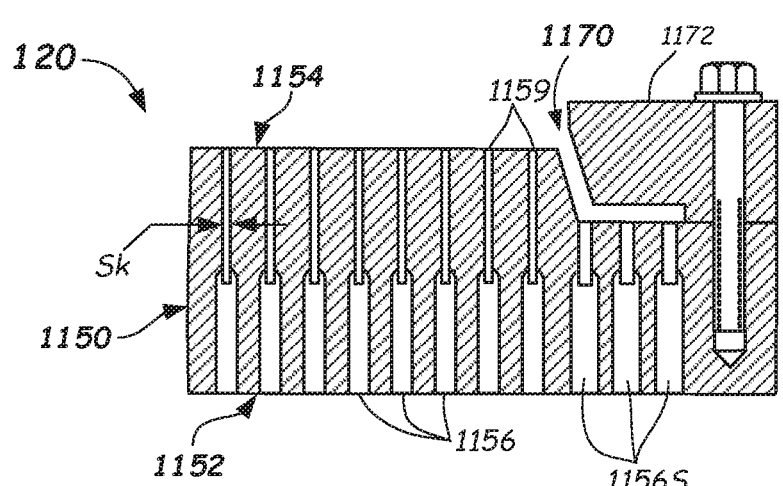
FIG. 11B schematically illustrates a partial cross-sectional side view of the honeycomb extrusion die of FIG. 11A taken along section line 11B-11B according to embodiments of the disclosure.

Referring now to FIG. 11A, a partial front view of the honeycomb extrusion die 120 (FIG. 1A) configured to manufacture the honeycomb structure 400 (FIG. 4A) and honeycomb bodies comprising the honeycomb structure 400 therein is provided. FIG. 11B is a schematic illustration of a cross-sectioned view of a portion of the honeycomb extrusion die 120. Optionally, honeycomb structures and bodies including any one of embodiments described herein is provided. The honeycomb bodies may be formed by extrusion of the batch mixture 116 (FIG. 1), which is described, for example, in U.S. Pat. Nos. 3,885,977, 5,332,703, 6,391,813, 7,017,278, 8,974,724, WO2014/046912, and WO2008/066765, through the honeycomb extrusion die 120 to produce the green honeycomb extrudate 124 (FIGS. 1 and 2). The green honeycomb extrudate 124 may then be dried, such as described in U.S. Pat. Nos. 9,038,284, 9,335,093, 7,596,885, and 6,259,078, for example, to produce a green honeycomb body. The green honeycomb body may then be fired, such as described in U.S. Pat. Nos. 9,452,578, 9,446,560, 9,005,517, 8,974,724, 6,541,407, or U.S. Pat. No. 6,221,308 to form the honeycomb structure 400 or any of the other honeycomb structures described herein. Other suitable forming, drying, and/or firing methods can be used.

The honeycomb extrusion die 120 can comprise a die body 1150 such as a metal disc, a die inlet face 1152 configured to receive the batch mixture 116 from an extruder, and a die outlet face 1154 opposite from the die inlet face 1152 and configured to expel batch material in the form of a green honeycomb extrudate 124. The honeycomb extrusion die 120 may be coupled to an extruder (such as the twin-screw extruder 100 (FIG. 1A) or other extruder type that receives the batch material and forces the batch material under pressure through the honeycomb extrusion die 120.

The honeycomb extrusion die 120 can comprise a plurality of feedholes 1156 (a few shown and labeled) extending from the die inlet face 1152 into the die body 1150. The plurality of feedholes 1156 intersect with an array of slots 1158 (a few labeled) extending into the die body 1150 from the die outlet face 1154. The plurality of slots 1158 may have a slot thickness Sk measured transversely across the slots 1158. The slot thickness Sk may be selected based on the total shrinkage of the batch material that is used (e.g., shrinkage from extrusion through firing) so that the fired honeycomb body has a predetermined transverse wall thickness of the porous walls 414 (FIG. 4A). For example, for a nominal extrude-to-fire shrinkage of 10%, the slot thickness Sk and may be selected to be less 10% greater than the transverse wall thickness of the porous walls of the honeycomb structure 400.

The plurality of feedholes 1156 connect with, and can be configured to feed batch mixture to, the slots 1158. The array of slots 1158 intersect with one another as shown in FIG. 11A. The array of slots 1158 form an array of die pins 1160 (a few labeled) that are arranged in a die pin structure across the die outlet face 1154. In some embodiments, one or more die pins 1160 comprise at least one divot (not shown).

The array of slots 1158 and die pins 1160 may be arranged in a repeating pin unit 1130 similar to the repeating unit cells 430 (FIG. 4A). A single repeating pin unit 1130 is shown in FIG. 11A by dashed lines. The repeating pin unit 1130 can comprise four die pins 1160 arranged to form the channels 410 (FIG. 4A) of the repeating unit cell 430. For example, three of the four die pins 1160 may be referred to as inlet die pins 1160$i$ and can be configured to form the inlet channels 432A-432C and one of the die pins 1160 may be referred to as an outlet pin 1160$o$ and may be configured to form the outlet channel 434. Although, it should be recognized that the outlet channel is not formed until it is plugged as described above. Each of the die pins 1160$i$, 1160$o$ are abutted by or formed by four slots. At least slot abutting an inlet pin 1160$i$ or an outlet pin 1160$o$ can be intersected midslot by another slot. An area of an outlet pin 1160*o* can be equal to or less than an area of any of the inlet pins 1160*i* and continuous slot segments 1115 can extend along slots of at least three repeating pin units 1130.

In the depicted embodiment, the slots 1158 along the continuous slot segments 1115 can be formed by abrasive wheel slotting and/or by a wire electron discharge machining (EDM) process, for example. For example, the honeycomb structure embodiments include walls that extend the lengths of the inlet ends of the honeycomb bodies. These walls can correspond to similar slots in the honeycomb extrusion die 120 that extend the length of the honeycomb extrusion die 120. Such slots can be formed by abrasive wheel slotting or other cutting methods. Slots 1159 forming the shorter wall segments in the repeating unit cells may be formed by plunge EDM or other similar processes. Accordingly, the majority of slot formation may be accomplished by more cost effective methods, which may reduce the cost of the honeycomb extrusion die 120 relative to extrusion dies that do not enable the majority of slot to be cut in this manner.

The honeycomb extrusion die 120 may comprise a skin-forming portion 1170 comprising a skin-forming mask 1172 (e.g., a ring-shaped article) that interfaces with batch from skin forming feedholes 1156S and recessed skin-forming region outboard of the die outlet face 1154 to form an extruded skin 212 on the green honeycomb extrudate 124 formed during the extrusion method.

Figure 12:
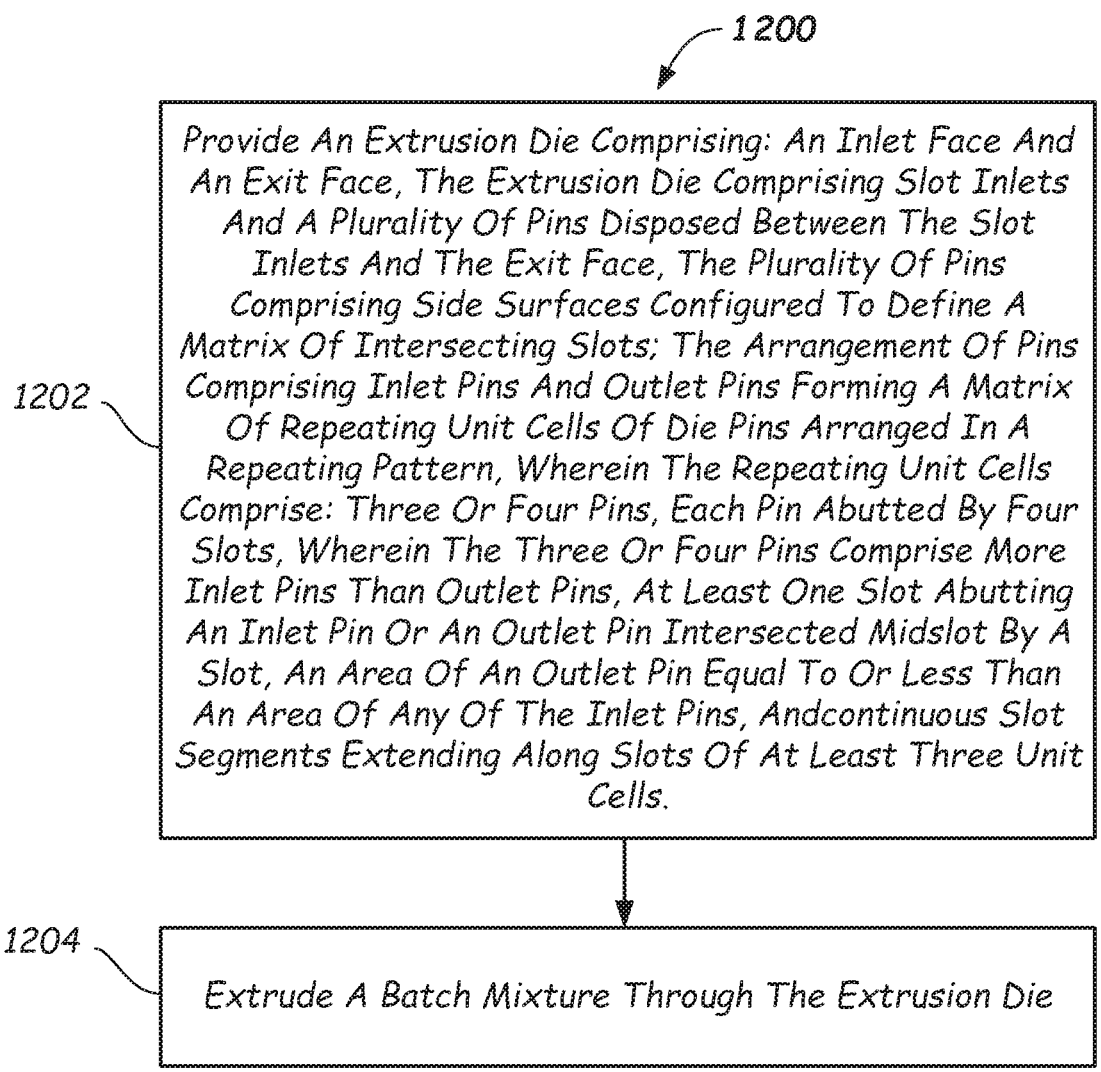
FIG. 12 illustrates a flowchart describing a method of manufacturing a honeycomb structure according to embodiments of the disclosure.

In another aspect, a method of manufacturing a honeycomb structure (e.g., honeycomb structure 400) is provided. Reference is made to the flowchart 1200 of FIG. 12 where the method is described. The flowchart 1200 includes, in 1202, providing an extrusion die (e.g., honeycomb extrusion die 120) comprising: an inlet face (e.g., inlet die face 1152) and an exit face (e.g., die outlet face 1154), the extrusion die comprising slot inlets and a plurality of pins (e.g., die pins 1160) disposed between the slot inlets and the exit face, the plurality of pins comprising side surfaces configured to define a matrix of intersecting slots (e.g., slots 1158); the arrangement of pins comprising inlet pins (e.g., inlet pins 1160*i*) and outlet pins (e.g., outlet pins 11600) forming a matrix of repeating pin units (e.g., repeating pin units 1130) of die pins arranged in a repeating pattern, wherein the repeating pin units comprise: three or four pins, each pin abutted by four slots, wherein the three or four pins comprise more inlet pins than outlet pins, at least one slot abutting an inlet pin or an outlet pin intersected midslot by a slot, an area of an outlet pin equal to or less than an area of any of the inlet pins, and continuous slot segments extending along slots of at least three of the repeating pin units. The flowchart 1200 includes, in 1204, extruding a batch mixture through the extrusion die.

The honeycomb bodies and honeycomb structures described herein have benefits over traditional honeycomb bodies and honeycomb structures. For example, the honeycomb bodies and honeycomb structures provide higher ash storage and lower pressure drop than traditional honeycomb bodies and honeycomb structures. Dies used to produce the honeycomb bodies can be produced with straight wire cut EDM or saw cut technology with minimal usage of plunge EDM manufacturing processes, which reduces the die manufacturing costs. Even where plunge EDM is used for forming the short slots, the EDM electrodes can comprise a simple design and configuration. Divots may be added to at least some of the pins on the extrusion die as opposed to dies used with ACT.

The foregoing description discloses only example embodiments of the disclosure. Modifications of the above disclosed plugged honeycomb bodies, honeycomb structures, extrusion dies, and methods which fall within the scope of the disclosure will be readily apparent to those of ordinary skill in the art. Accordingly, while the present disclosure has been described in connection with example embodiments thereof, it should be understood that other embodiments may fall within the scope of the disclosure, as defined by the claims.

What is claimed is:

1. A honeycomb structure, comprising:
   intersecting porous walls extending in an axial direction between an inlet end and an outlet end of the honeycomb structure, the intersecting porous walls forming a matrix of repeating unit cells arranged in a repeating pattern, wherein the repeating unit cells comprise:
   three or four channels, each channel formed by four walls, wherein the three or four channels comprise more inlet channels than outlet channels,
   at least one wall of an inlet channel or an outlet channel is intersected midwall by a wall,
   an area of an outlet channel is equal to or less than an area of any of the inlet channels, and
   continuous line segments extending along walls of at least three repeating unit cells;
   wherein one or more of the repeating unit cells comprise:
   a first group of channels comprising a first inlet channel adjacent a second inlet channel, wherein the first inlet channel and the second inlet channel are aligned in a y-direction;
   a first wall common to the first inlet channel and the second inlet channel, the first wall extending in an x-direction, wherein the x-direction, the y-direction, and the axial direction are orthogonal; and
   a second group of channels adjacent the first group of channels and including an outlet channel adjacent a third inlet channel aligned in the y-direction,
   wherein the first wall intersects a wall of either the outlet channel or the third inlet channel midwall; and
   wherein:
   channels in the first group have first widths extending in the y-direction and first lengths extending in the x-direction,
   channels in the second group have second widths extending in the y-direction and second lengths extending in the x-direction,
   the first widths are equal to the second widths, and
   the first lengths are longer than the second lengths.

2. The honeycomb structure of claim 1, wherein one or more of the repeating unit cells comprise non-square, rectangular-shaped channels and square-shaped channels in transverse cross-section.

3. The honeycomb structure of claim 1, wherein one or more of the repeating unit cells comprise all square-shaped channels in transverse cross-section.

4. The honeycomb structure of claim 1, wherein all the channels have widths extending in the y-direction and lengths extending in the x-direction, wherein the widths are longer than the lengths.

5. The honeycomb structure of claim 1, wherein all the channels have widths extending in the y-direction and lengths extending in the x-direction, wherein the widths are twice as long as the lengths.

6. The honeycomb structure of claim 1, wherein the second widths are twice as long as the second lengths.

7. The honeycomb structure of claim 1, wherein:
channels in the first group have first widths extending in the y-direction and first lengths extending in the x-direction,
channels in the second group have second widths extending in the y-direction and second lengths extending in the x-direction,
the first widths are equal to the second widths, and
the first lengths are equal to the second lengths.

8. A honeycomb structure, comprising:
intersecting porous walls extending in an axial direction between an inlet end and an outlet end of the honeycomb structure, the intersecting porous walls forming a matrix of repeating unit cells arranged in a repeating pattern, wherein the repeating unit cells comprise:
three or four channels, each channel formed by four walls, wherein the three or four channels comprise more inlet channels than outlet channels,
at least one wall of an inlet channel or an outlet channel is intersected midwall by a wall,
an area of an outlet channel is equal to or less than an area of any of the inlet channels, and
continuous line segments extending along walls of at least three repeating unit cells;
wherein one or more of the repeating unit cells comprise:
a first group of channels comprising a first inlet channel adjacent a second inlet channel, wherein the first inlet channel and the second inlet channel are aligned in a y-direction;
a first wall common to the first inlet channel and the second inlet channel, the first wall extending in an x-direction, wherein the x-direction, the y-direction, and the axial direction are orthogonal; and
a second group of channels adjacent the first group of channels and including an outlet channel adjacent a third inlet channel aligned in the y-direction,
wherein the first wall intersects a wall of either the outlet channel or the third inlet channel midwall;
wherein:
channels in the first group are rectangular-shaped in transverse cross-section; and
channels in the second group are square-shaped in transverse cross-section; and
wherein channels in the first group have widths extending in the y-direction and lengths extending in the x-direction, and wherein the lengths are longer than the widths.

9. A honeycomb structure, comprising:
intersecting porous walls extending in an axial direction between an inlet end and an outlet end of the honeycomb structure, the intersecting porous walls forming a matrix of repeating unit cells arranged in a repeating pattern, wherein the repeating unit cells comprise:
three or four channels, each channel formed by four walls, wherein the three or four channels comprise more inlet channels than outlet channels,
at least one wall of an inlet channel or an outlet channel is intersected midwall by a wall,
an area of an outlet channel is equal to or less than an area of any of the inlet channels, and
continuous line segments extending along walls of at least three repeating unit cells;
wherein one or more of the repeating unit cells comprise:
a first inlet channel adjacent a second inlet channel;
a common wall to the first inlet channel and the second inlet channel, the common wall extending in an x-direction, wherein the x-direction, a y-direction, and the axial direction are orthogonal; and
an outlet channel adjacent the first inlet channel and the second inlet channel,
wherein the common wall intersects a wall of the outlet channel midwall;
wherein the first inlet channel and the second inlet channel are aligned in the y-direction; and
wherein:
the first inlet channel and the second inlet channel each have first widths extending in the y-direction and a first length extending in the x-direction,
the outlet channel has a second width extending in the y-direction and a second length extending in the x-direction,
the first widths are equal to the second width, and
the first length is less than the second length.

10. The honeycomb structure of claim 9, wherein the first widths are longer than the first length.

11. The honeycomb structure of claim 9, wherein the first widths are twice as long as the first length.

12. A honeycomb structure, comprising:
intersecting porous walls extending in an axial direction between an inlet end and an outlet end of the honeycomb structure, the intersecting porous walls forming a matrix of repeating unit cells arranged in a repeating pattern, wherein the repeating unit cells comprise:
three or four channels, each channel formed by four walls, wherein the three or four channels comprise more inlet channels than outlet channels,
at least one wall of an inlet channel or an outlet channel is intersected midwall by a wall,
an area of an outlet channel is equal to or less than an area of any of the inlet channels, and
continuous line segments extending along walls of at least three repeating unit cells;
wherein one or more of the repeating unit cells comprise:
a first channel adjacent a second channel, the first channel and the second channel aligned in an x-direction, wherein the x-direction, a y-direction, and the axial direction are orthogonal;
a first common wall common to the first channel and the second channel, the first common wall extending in the y-direction; and
a third channel adjacent the first channel and the second channel and comprising a second common wall extending in the x-direction and intersected midwall by the first common wall,
wherein the second common wall is common to a wall of the first channel and a wall of the second channel, and
wherein one of the first channel, the second channel, and third channel is an outlet channel.

13. The honeycomb structure of claim 12, wherein the first channel has a first width extending along the y-direction and the third channel has a second width extending along the y-direction, and wherein the first width is longer than the second width.

14. The honeycomb structure of claim 12, wherein the first channel has a first width extending in the y-direction and the third channel has a second width extending in the y-direction, and wherein the first width is twice the size of the second width.

15. The honeycomb structure of claim 12, wherein the first channel has a first width extending in the y-direction and the third channel has a first length extending in the x-direction, and wherein the first width is the same length as the first length.

* * * * *